United States Patent [19]

Lemay et al.

[11] Patent Number: 5,280,595
[45] Date of Patent: Jan. 18, 1994

[54] STATE MACHINE FOR EXECUTING COMMANDS WITHIN A MINIMUM NUMBER OF CYCLES BY ACCOMODATING UNFORSEEN TIME DEPENDENCY ACCORDING TO STATUS SIGNALS RECEIVED FROM DIFFERENT FUNCTIONAL SECTIONS

[75] Inventors: Richard A. Lemay, Carlisle; Steven A. Tague, Tyngsboro; William E. Woods, Natick, all of Mass.

[73] Assignee: Bull HN Information Systems Inc., Billerica, Mass.

[21] Appl. No.: 593,923

[22] Filed: Oct. 5, 1990

[51] Int. Cl.⁵ .............. G06F 9/26; G06F 9/28; G06F 13/00
[52] U.S. Cl. .................... 395/425; 395/375; 364/239.4; 364/243.3; 364/254; 364/255.5; 364/255.8; 364/261; 364/261.1; 364/263.1; 364/244.9; 364/DIG. 1
[58] Field of Search .............. 395/375, 425, 400

[56] References Cited

U.S. PATENT DOCUMENTS

| | | | |
|---|---|---|---|
| 3,766,532 | 10/1973 | Liebel, Jr. | 395/775 |
| 4,128,880 | 12/1978 | Cray, Jr. | 395/800 |
| 4,168,523 | 9/1979 | Chari et al. | 395/425 |
| 4,392,198 | 7/1983 | Shimazaki | 395/400 |
| 4,467,415 | 8/1984 | Ogawa | 395/375 |
| 4,594,661 | 6/1986 | Moore et al. | 395/775 |
| 4,685,080 | 8/1987 | Rhodes, Jr. et al. | 395/375 |
| 4,691,278 | 9/1987 | Iwata | 395/375 |
| 4,739,472 | 4/1988 | Hayashi | 395/375 |
| 4,821,183 | 4/1989 | Hauris | 395/375 |
| 4,825,363 | 4/1989 | Baumann et al. | 395/375 |
| 4,835,733 | 5/1989 | Powell | 395/400 |
| 4,875,160 | 10/1989 | Brown, III | 395/375 |
| 4,979,098 | 12/1990 | Baum et al. | 395/400 |
| 4,984,192 | 1/1991 | Flynn | 364/900 |

OTHER PUBLICATIONS

Stored State Asynchronous Sequential Circuits, by Alan B. Hayes, published in IEEE Transactions on Computers, vol. C-30, No. 8, Aug. 1981, pp. 596-600.
Optimal State Chains and State Codes in Finite State Machines by Rainer Amann & Utz G. Baitinger, published in IEEE Transactions on Computer-Aided Design, vol. 8, No. 2, Feb. 1989, pp. 153-170.

Primary Examiner—Lawrence E. Anderson
Assistant Examiner—Meng-Ai T. An
Attorney, Agent, or Firm—Faith F. Driscoll; John S. Solakian

[57] ABSTRACT

A virtual memory unit (VMU) includes a state machine for controlling its operations in response to commands received from another unit. The state machine includes a plurality of programmable array logic (PAL) devices which are connected to gather status from the different sections of the unit. The outputs of the PAL devices connect in common and supply a first address input to an addressable state memory. The state memory includes a plurality of locations, each of which stores a binary code defining a different machine state. The state memory locations are accessed as a function of the status signals and current state and used in turn to generate the required subcommands for executing the received commands. The state machine makes it possible to easily classify the received commands to their complexity and urgency in terms of their effect on overall system performance.

13 Claims, 7 Drawing Sheets

STATE MACHINE FOR EXECUTING COMMANDS WITHIN A MINIMUM NUMBER OF CYCLES BY ACCOMODATING UNFORSEEN TIME DEPENDENCY ACCORDING TO STATUS SIGNALS RECEIVED FROM DIFFERENT FUNCTIONAL SECTIONS

RELATED PATENT APPLICATIONS AND PATENTS

1. The patent application of Ming-Tzer Miu and Thomas F. Joyce entitled, "Production Line Method and Apparatus for High Performance Instruction Execution," filed on Dec. 19, 1988, bearing Ser. No. 07/286,580, now abandoned, which is assigned to the same assignee as this patent application.

2. The patent application of David E. Cushing, Romeo Kharileh, Jian-Kuo Shen and Ming-Tzer Miu entitled, "Dual Port Read/Write Register File Memory," filed on Dec. 19, 1988, bearing Ser. No. 07/286,552, issued as U.S. Pat. No. 4,933,909 on Jun. 12, 1990, which is assigned to the same assignee as this patent application.

3. The patent application of Jian-Kuo Shen, Richard P. Kelly, Robert V. Ledoux and Deborah K. Staplin entitled, "Control Store Addressing from Multiple Sources," filed Dec. 19, 1988, bearing Ser. No. 07/286,578, issued as U.S. Pat. No. 5,197,133 on Mar. 23, 1993 and which is assigned to the same assignee as this patent application.

4. The patent application of Richard P. Kelly, Jian-Kuo Shen, Robert V. Ledoux and Chester M. Nibby, Jr. entitled, "Control Store Double Pump Operation," filed on Dec. 19, 1988, bearing Ser. No. 07/286,581, issued as U.S. Pat. No. 4,916,601 on Apr. 10, 1990, which is assigned to the same assignee as this patent application.

5. The patent application of Richard P. Kelly and Robert V. Ledoux entitled, "Control Store Address Generator for Developing Unique Instruction Execution Starting Address," filed on Dec. 19, 1988, bearing Ser. No. 07/286,582, now abandoned which is assigned to the same assignee as this application.

6. The patent application of David E. Cushing, Richard P. Kelly, Robert V. Ledoux and Jian-Kuo Shen entitled, "Mechanism for Automatically Updating Multiple Unit Register File Memories in Successive Cycles for a Pipelined Processing System," filed on Dec. 19, 1988, bearing Ser. No. 07/286,551, issued as U.S. Pat. No. 4,980,819 on Dec. 25, 1990 and which is assigned to the same assignee as this application.

7. The patent application of Richard P. Kelly and Robert V. Ledoux entitled, "Automatic Data Steering Mechanism for Alignment of Operands into and out of an Execution Unit," filed on Mar. 31, 1989, bearing Ser. No. 07/331,991, issued as U.S. Pat. No. 5,179,671 on Jan. 12, 1993 and which is assigned to the same assignee as this application.

8. The patent application of Robert V. Ledoux, Richard P. Kelly and Forrest M. Phillips entitled, "Ring Reduction Logic Mechanism," filed on Mar. 31, 1989, bearing Ser. No. 07/332,258, issued as U.S. Pat. No. 5,117,491 on May 26, 1992 and which is assigned to the same assignee as this application.

9. The patent application of Deborah K. Staplin, Jian-Kuo Shen and Ming-Tzer Miu entitled, "Resource Conflict Detection Method and Apparatus Included in a Pipelined Processing Unit," filed on Jun. 30, 1989, bearing Ser. No. 07/374,882, issued as U.S. Pat. No. 5,073,855 on Dec. 17, 1991 and which is assigned to the same assignee as this application.

10. The patent application of Deborah K. Staplin and Jian-Kuo Shen entitled, "Instruction Unit Logic Management Apparatus Included in a Pipelined Processing Unit," filed on Jun. 30, 1989, bearing Ser. No. 07/374,881, issued as U.S. Pat. No. 5,150,468 on Sep. 22, 1992 and which is assigned to the same assignee as this application.

11. The patent application of Forrest M. Phillips entitled, "Least Recently Used Replacement Level Generating Apparatus," filed on Sep. 1, 1989, bearing Ser. No. 07/402,192, issued as U.S. Pat. No. 5,125,085 on Jun. 23, 1992 and which is assigned to the same assignee as this application.

12. The patent application of Thomas F. Joyce, Ming-Tzer Miu and Richard P. Kelly entitled, "Apparatus and Method for Increased Operand Availability in a Data Processing Unit with a Store Through Cache Memory Unit Strategy," filed on Jan. 5, 1989, bearing Ser. No. 07/294,529, issued as U.S. Pat. No. 5,123,097 on Jun. 16, 1992 and which is assigned to the same assignee as this application.

13. The patent application of Thomas F. Joyce, Robert C. Miller and Marc Vogt entitled, "Apparatus and Method for Data Group Coherency in a Tightly Coupled Data Processing System," filed on Jan. 5, 1989, bearing Ser. No. 07/294,534, issued as U.S. Pat. No. 5,148,533 on Sep. 15, 1992 and which is assigned to the same assignee as this application.

14. The patent application of Forrest M. Phillips, Thomas F. Joyce and Ming-Tzer Miu entitled, "Apparatus and Method for Address Translation of Non-Aligned Double Word Virtual Addresses," filed on Jan. 5, 1989, bearing Ser. No. 07/294,528, issued as U.S. Pat. No. 5,051,894 on Sep. 24, 1991 and which is assigned to the same assignee as this application.

15. The patent application of Steven A. Tague entitled, "Robust Virtual Memory Unit with Selective Retry," filed on Oct. 5, 1990, bearing Ser. No. 07/593,825 which is assigned to the same assignee as this application.

BACKGROUND OF THE INVENTION

1. Field of Use

The present invention relates to data processing and more particularly to state machine apparatus.

2. Prior Art

It is well known to use ROM or PROM controlled state machines to produce control signals from previous state and instruction inputs. Such state machines normally comprise a set of state flip-flops whose state is switched as a function of input status signals generated during a previous cycle of operation. Examples of such state machines are disclosed in U.S. Pat. Nos. 4,875,160 and 4,835,733 which issued on Oct. 17, 1989 and May 30, 1989, respectively.

The introduction of field programmable ROM's (PROM's) simplified the process of realizing synchronous sequential circuits by enabling the development of stored state techniques. In such an arrangement, the PROM contains the state table and generates from the current state and inputs, a next state and outputs which are inputs to a register. State changes occur periodically and synchronously with the system clock. This type of arrangement is discussed in the article entitled, "Stored State Asynchronous Sequential Circuits," by Alan B. Hayes, published in IEEE Transactions on Computers, Vol. C-30, No. 8, August 1981, pages 596-600. However, when it becomes necessary to increase the number of inputs to the state machine and number of states, circuit complexity of conventionally realized asynchronous state machines increase very rapidly. Thus, one approach has been to decompose a single machine/unit design into a collection of smaller and more easily realizable state machines. This approach typically is found to increase the part count and substantially slow down the operation of the unit.

In the case of VLSI circuits, it has been a common practice to implement smaller finite state machines (FSM's) as single programmable logic array (PLA) FSM's with delay (D) latches used as state memories. When large FSM's are implemented, more comprehensive structures are required. In such cases, the next state function and the output functions are implemented in several PLA's. Additionally, the state memory is implemented by a loadable counter. This approach is used as the control structure for various microprocessor designs and is discussed in the article entitled, "Optimal State Chains and State Codes in Finite State Machines," by Rainer Amann and Utz G. Baitinger, published in IEEE Transactions on Computer-Aided Design, Vol. 8, No. 2, February 1989, pages 153-170.

The above approach still lacks the requisite flexibility in assigning states which can take into account any time dependencies or hardware requirement of other units which operate in conjunction with the state machine unit. For example, when the unit is a virtual memory unit (VMU), it is required to perform the function of translating virtual addresses into physical addresses. If the VMU is included as one stage of a pipelined machine, any delay in performing the translation can seriously impact the overall performance of the machine. The process of performing such translations is complicated where the VMU is required to provide support for other pipeline stages, particularly where certain time dependencies and hardware requirements exist.

Accordingly, it is a primary object of the present invention to provide state machine apparatus and method which is highly programmable.

It is a further object of the present invention to provide a programmable state machine which can be readily altered to accommodate unforeseen time dependencies and additional hardware requirements.

SUMMARY OF THE INVENTION

The above and other objects of the present invention are achieved in a preferred embodiment of a unit which includes a state machine for defining sequential states used in generating control signals for sequencing the unit's operation. The state machine includes a plurality of programmable array logic (PAL) devices which are connected to gather status from the different sections or parts of the unit. The outputs of the PAL devices connect in common to form a bus which connects as a first address input to an addressable state memory.

The state memory has a plurality of storage locations, each of which stores a binary code defining a different machine state. The output of the memory connects as an input to a clocked state register for storing the binary code representing the current state. The state register contents are fed back as a second address input to the state memory. Additionally, predetermined portions of the current state register contents are fed back as enabling inputs to the PAL devices.

At the beginning of each cycle of operation, the next state binary code stored at the memory storage location defined by a combination of the first and second source addresses is read out from the state memory into the state register and becomes the current state code. The current state code is applied to the programmable array logic circuits distributed throughout the unit which form a subcommand generator. The combination or interaction of the current state code and command coded signals defining the type of operation being executed by the memory management unit determines what subcommands are generated for the particular state.

According to the teachings of the present invention, status signals from the different parts of the unit are consolidated. They are grouped in a predetermined manner for application to the inputs of the plurality of PAL devices so that the common bus can be controlled by only one of the PAL devices at a time.

As mentioned, the PAL device when enabled, provides a binary code representative of the presence of a particular combination or pattern of input status signals. The combination or pattern of input status signals normally corresponds to the result produced by a particular section or part of the unit during a current cycle of operation. This code which serves as a subaddress is combined with the current state binary code to form the address for accessing the state memory location which stores the next state code.

The assigning of binary codes for states is programmable. That is, the assignment codes can be changed to facilitate the programming of the PAL equations. More importantly, the state machine can be reprogrammed to change the functionality of the unit to accommodate certain time dependencies or the requirements of other units which are supported by the unit.

In more particular terms, a preferred embodiment of the unit corresponds to a virtual memory unit (VMU) stage which is the third stage of a five stage pipelined processing unit described in the first referenced related patent application. The VMU performs the main function of translating the virtual address received from the second stage address (A) unit stage into a physical address which it provides to the fourth E-cache stage. Additionally, the VMU is required to perform a number of support operations for these stages. Any failure of the VMU to perform its function within a specified cycle time will cause the previous pipeline stages to lose one or more cycles of operation waiting for the VMU to complete its operation.

The state machine of the present invention makes it possible to more easily classify the commands provided by the A-unit pipeline stage according to their complexity and urgency in terms of their effect on overall processor performance. The types of operations which were key to overall performance, as well as being frequent in occurrence, are assigned a single state or cycle for completion. These included such operations as read/write a single word, read/write a double word starting at an even memory address. Those operations which could not be completed within one cycle are assigned two cycles or as many states or cycles as required for completion. Such states are assigned so as not to interfere with the speed and efficiency of performing the one or two state operations.

The state machine of the present invention provides the flexibility of assigning states and the ability to reprogram the state machine to take into account commands having certain time requirements. This increased substantially the performance of the pipelined processor. Additionally, the state machine has the advantage of being implemented with a small number of standard circuit parts.

The novel features which are believed to be characteristic of the invention, both as to its organization and method of operation, together with further objects and advantages will be better understood from the following description when considered in connection with the accompanying drawings. It is to be expressly understood, however, that each of the drawings is given for the purpose of illustration and description only and is not intended as a definition of the limits of the present invention.

DESCRIPTION OF THE PREFERRED EMBODIMENT

Figure 1:
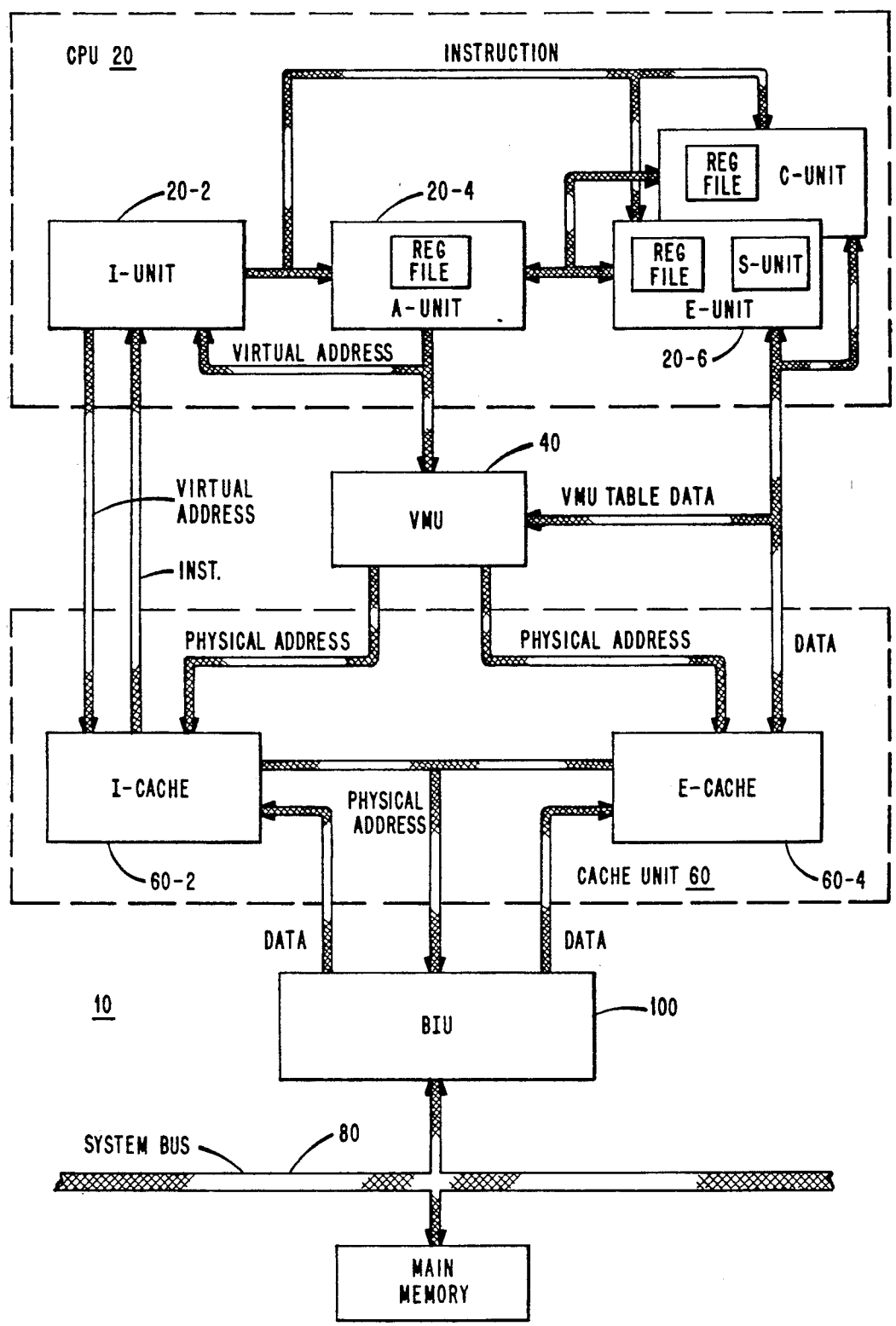
FIG. 1 is a block diagram of the pipelined processing unit which includes, a VMU stage incorporating the apparatus and method of the present invention.

FIG. 1 shows in block diagram form, a production data processing system 10. As shown, the system includes a central processing unit (CPU) 20, a virtual memory unit (VMU) 40 and a cache unit 60. The cache unit 60 couples to a system bus 80 through a bus interface unit (BIU) 100.

As shown, the main elements of CPU 20 include an instruction unit 20-2, an A-unit 20-4 and a number of execution (E) units 20-6. In the preferred embodiment, the execution units 20-6 include a scientific instruction processing unit (S-Unit) and a commercial instruction processing unit (C-Unit). The cache unit 60 includes an instruction cache (I-cache) 60-2 for storing instructions which are to be executed and an execution cache unit (E-cache) 60-4 for storing operands or data which are to be operated on according to the instructions being executed.

The I-unit 20-2 performs two main functions. It prefetches instructions from I-cache unit 60-2 and cracks or decodes these instructions to determine how the other units, namely the A-unit 20-4 and the E-unit 20-6 will further process those instructions. In addition, the I-unit 20-2 executes certain branch instructions which are then removed from the production line.

The A-unit 20-4 generates addresses from instructions it receives from the I-unit 20-2. Additionally, it executes certain types of instructions such as register-to-register type instructions removing them from the production line. When the instruction is a type of instruction which is to be executed by the E-unit 20-6, the A-unit 20-4 sends a virtual address to VMU 40 which translates it into a physical address for fetching the specified operands from the E-cache unit 60-4. The operands fetched from the E-cache unit 60-4 are then transferred to the E-unit 20-6 for completing the execution of the instruction originally received by the I-unit 20-2 from the I-cache unit 60-2. The A-unit 20-4 will also confirm the execution of a branch instruction and send the branch address back to the I-unit 20-2 which will have already requested the next instruction from I-cache unit 60-2 specified by the I-unit 20-2 prefetch branch address.

Both the A-unit 20-4 and E-unit 20-6 include register files which store the contents of the registers which are programmer accessible. Also, both the I-cache unit 60-2 and E-cache unit 60-4 are updated with instructions and operands fetched from main memory via system bus 80 and BIU 100.

Production Line Mode of Operation

Instructions are executed in a production line fashion by the elements of CPU 20. That is, the I-unit 20-2 receives each instruction from I-cache unit 60-2, cracks it and then sends the instruction to the A-unit 20-4. The A-unit 20-4 either executes the instruction or sends the virtual address to the VMU 40 for translation in order to fetch the required operands from E-cache unit 60-4 which are in turn sent to E-unit 20-6.

While the A-unit 20-4 is executing its portion of a first instruction received from I-unit 20-2, the I-unit 20-2 is fetching a second instruction and subsequent instructions from I-cache unit 60-2. When the A-unit 20-4 sends the virtual address specified by the first instruction to VMU 40 and notifies the I-unit 20-2 of that event, the I-unit 20-2 sends the second instruction to A-unit 20-4. The VMU 40 addresses E-cache unit 60-4 while the A-unit 20-4 is processing the second instruction introduced into the production pipeline. When the E-unit 20-6 is executing the first instruction, VMU 40 may be fetching operands from the E-cache unit 60-4 specified by the second instruction while the A-unit 20-4 is generating a virtual address for a third instruction. At the same time, the I-unit 20-2 is cracking a fourth instruction and fetching a next instruction. Thus, there could be five instructions progressing down the production line at a given instant of time.

However, since the I-unit 20-2 can execute certain branch instructions and the A-unit 20-4 can execute certain software visible register instructions, these instructions are removed from the production line as soon as the execution of these instructions are completed. Also, when the A-unit 20-4 is processing a branch instruction and the conditions of the branch are met, the A-unit 20-4 immediately confirms the branch address received from the I-unit 20-2 and the branch instruction is removed from the production line.

Accordingly, it is important that each pipeline stage perform its operations so as not to interrupt or delay production line operation. The state machine of the present invention enables VMU40 to execute a large number of operations within a single cycle of operation.

VMU40

Figure 2A:
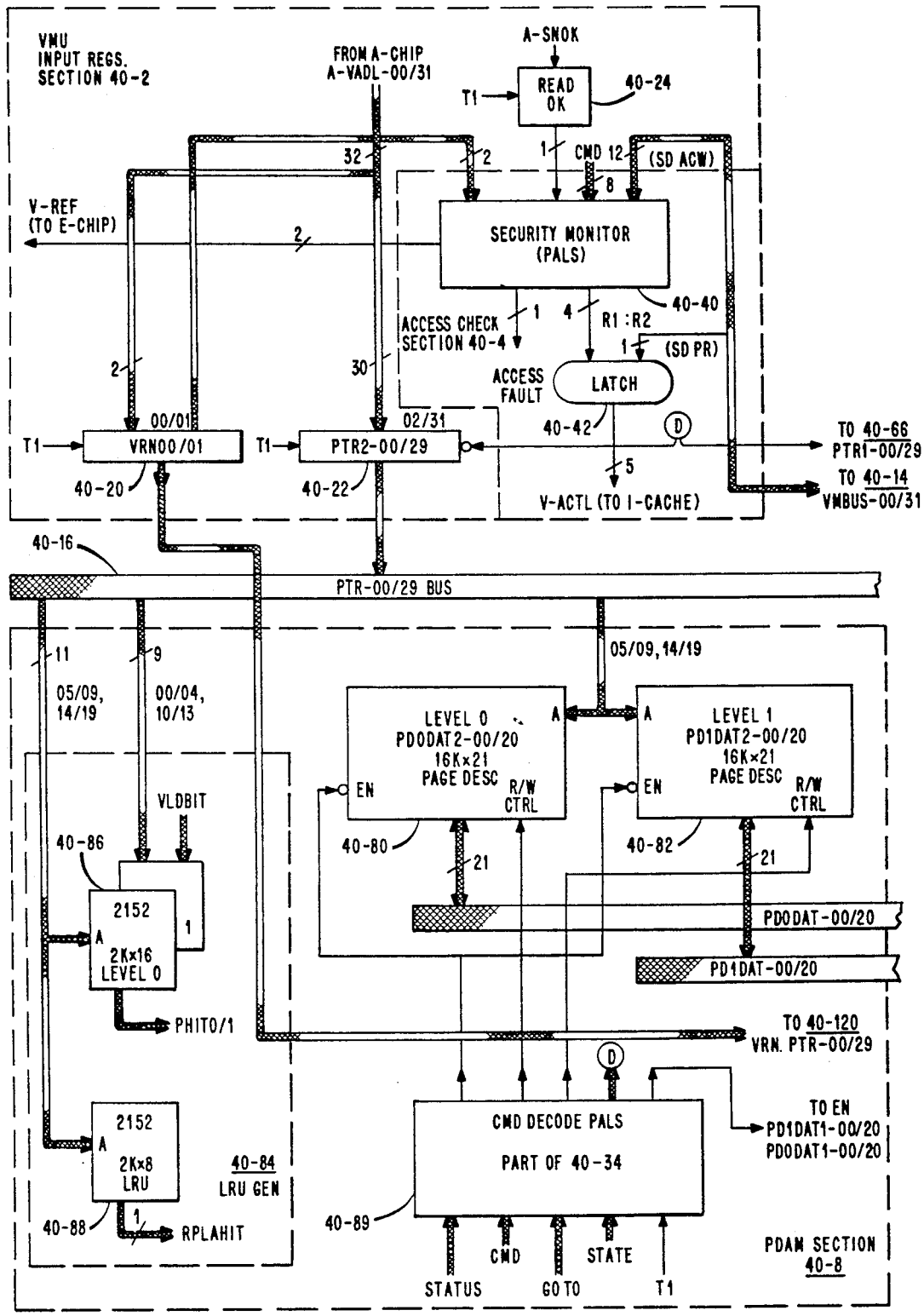
FIGS. 2a, 2b and 2c shows in block diagram form, the VMU stage of FIG. 1.
Figure 2B:
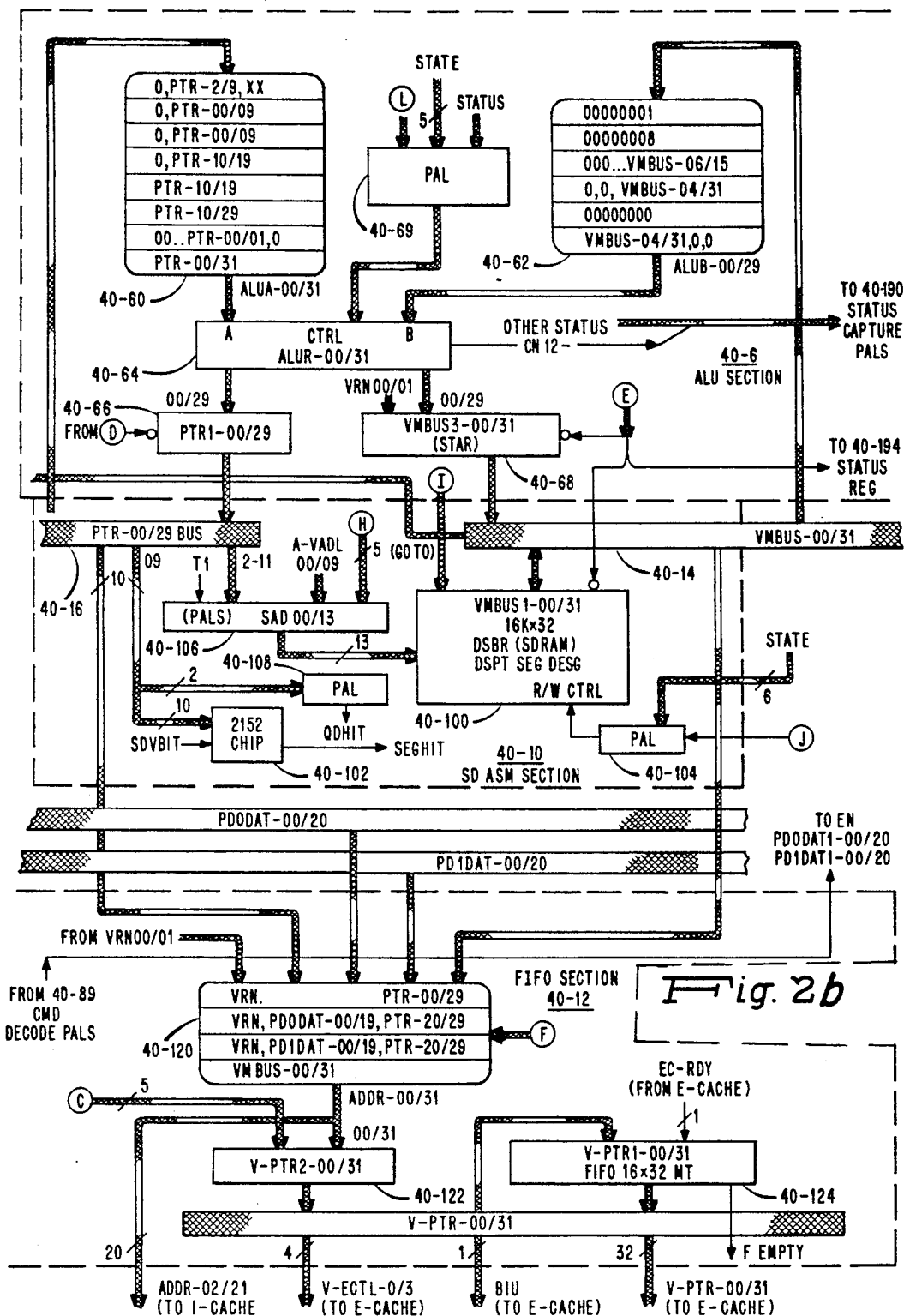
Figure 2C:
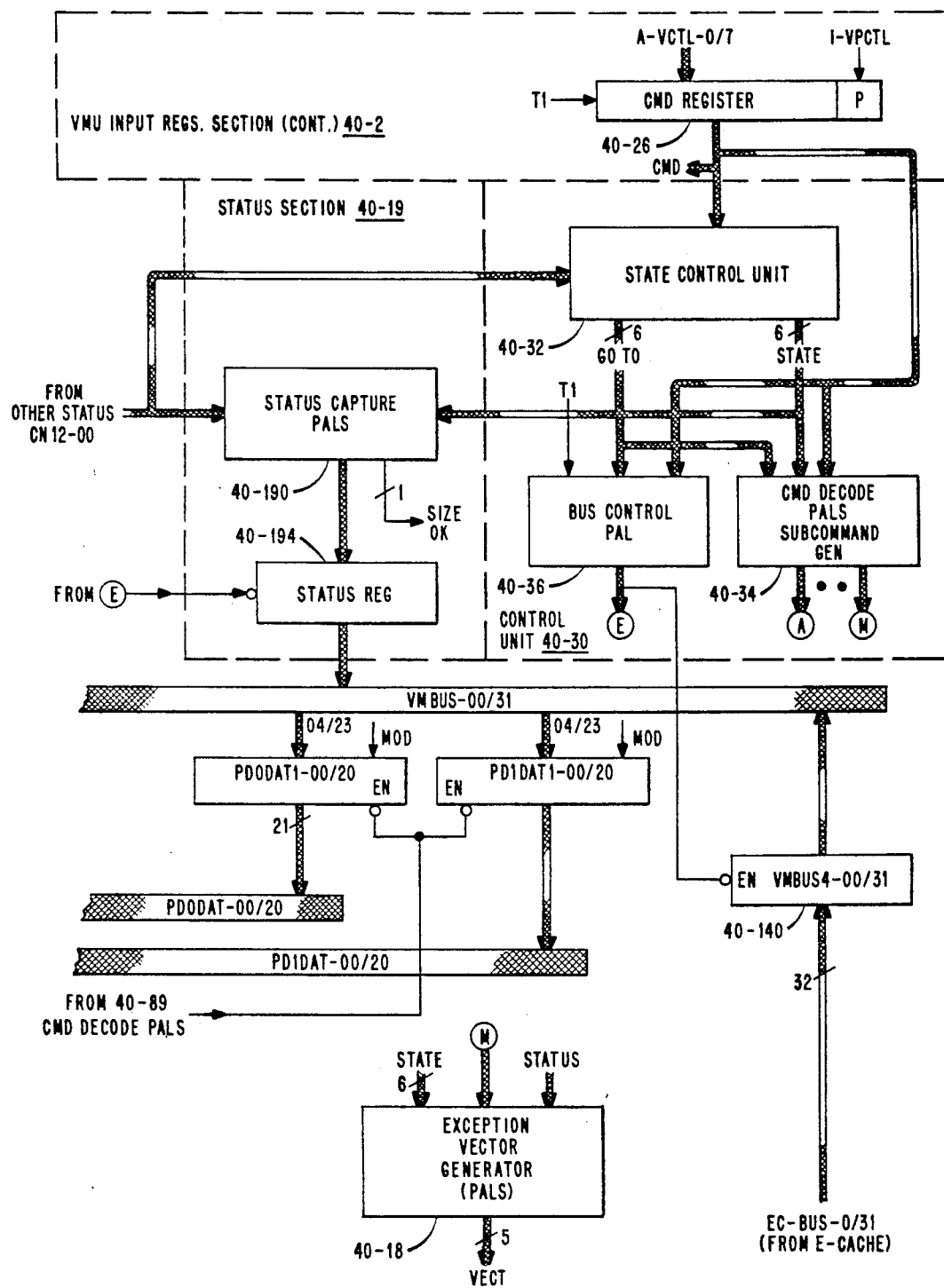

FIG. 2a through 2c show the VMU40 in greater detail. As seen from FIGS. 2a through 2c, VMU40 includes a number of different functional areas or sections. The sections include an input register section 40-2, an access check section 40-4, an ALU section 40-6, a page descriptor (PD) associator section 40-8, a segment descriptor (SD) section 40-10 and a FIFO section 40-12. Additionally, VMU40 has a VMBUS section 40-14, a pointer (PTR) bus section 40-16, an exception vector generator section 40-18, a status section 40-19 and a control logic section 40-30 which is constructed according to the teachings of the present invention.

INPUT REGISTER SECTION 40-2

The input register section 40-2 of FIGS. 2a and 2c includes the virtual address (VAR) input clocked registers which store or capture the input address, control and command signals applied by the A-unit 20-4 at the beginning of each cycle. These registers include a 2-bit position ring number (RN) register 40-20, a 30-bit position virtual pointer register 40-22, a 4-bit position control register 40-24 and a 9-bit (includes parity) position command register 40-26. Address and command parity are checked at the beginning of each command sequence.

The ring number contents of register 40-20 are applied as an input to access check section 40-4, FIFO section 40-12 and control logic section 40-30. The current pointer contents of virtual pointer register 40-22 are applied as an input to ALU section 40-6, PD associator section 40-8, SD section 40-10 and FIFO section 40-12. The contents of control register 40-24 and command register 40-26 are applied as inputs to control logic section 40-30.

ACCESS CHECK SECTION 40-4

The access check section 40-4 performs the various access and security monitoring functions. These include read and write access checks when required, access checking for read modify write (RMW) operations, ring bracket checks for E-cache address pointers and gate bracket security checks for call instructions. The type of access check performed is specified by the control code passed to VMU40 by A-unit 20-4 with the virtual address pointer. For operand access checking, the read (R) and write (W) permission bits with the SD ACW may be checked, the ring brackets R1, R2 may be checked and traps (access fault) may be issued.

As shown in FIG. 2a, section 40-4 includes a security monitor block 40-40 and a two-way multiplexer and latch 40-42. The security monitor block 40-40 includes a PAL device which receives the ring number signals (VRN0-1), control signal READOK derived from A-unit signal A-SNOK indicating the virtual address pointer is within the range of the procedure segment, and segment descriptor access check word (ACW) signals from SDASM section 40-10 via VMBUS section 40-14.

The security monitor PAL generates as outputs, effective ring number signals V-REF, effective ring bracket signals R1 and R2 and an access fault signal (ALARM). The effective ring bracket signals R1 and R2 are applied as inputs to latch 40-42, along with the privileged (PR) bit obtained from the SDACW word. The R1 and R2 ring bracket signals and the PR bit are passed along to I-cache 60-2 together with the page frame number (PRN). The PRN is obtained from the page descriptor for the associated virtual address pointer if paged or generated by VMU40 if unpaged. The access fault signal (ALARM) is one of the status signals which is applied as an input to the control logic section 40-30.

ALU SECTION 40-6

The ALU section 40-6 of FIG. 2b performs the required arithmetic operations for carrying out address development and boundary/size checking functions. As shown, section 40-6 includes an A input multiplexer 40-60, a B input multiplexer 40-62 and an adder 40-64. The section 40-6 further includes a pair of output registers corresponding to a PTR1 register 40-66 and a STAR register 40-68 arranged as shown. The PTR1 register 40-66 connects to the PTR bus 40-16 while the STAR register 40-68 connects to VMBUS 40-14.

The adder 40-64 is controlled by a PAL device 40-69 which receives signals from control logic section 40-30 as described in greater detail herein. The adder 40-64 generates a carry out signal CN12 for indicating an overflow condition at the 1024 word boundary. This signal is applied as an input to one of a group of PAL devices of status section 40-19 which results in the generation of a signal SIZEOK. The SIZEOK signal is applied as another one of status signals to control logic section 40-30 along with signal CN12. The multiplexers 40-60 and 40-62 provide 32-bit operand signals as inputs to adder 40-64 from the PTR bus 40-16 and VMBUS 40-14. Additionally, multiplexer 40-62 provides as B operand inputs, constants having the values 0, 1 and 8 as indicated.

PAGE DESCRIPTOR ASSOCIATOR SECTION 40-8

PDASM section 40-8 of FIG. 2a includes a two-level set associative cache memory which is used to store and retrieve 20-bit page descriptors used by the virtual memory system. Along with each 20-bit descriptor, a modified (M) bit is stored. The M bit outputs from chips 40-80 and 40-82 are applied as status input signals to control logic section 40-30. These descriptors which are stored in level 0 and level 1 memory chips 40-80 and 40-82 are replaced on a least recently used basis by signals generated by least recently used (LRU) generator 40-84. The LRU generator 40-84 includes address comparator chips 40-86 and an LRU chip 40-88. The chips 40-86 generate hit signals PHIT0 and PHIT1 for indicating whether either level contains the page descriptor corresponding to the virtual address being translated. LRU chip 40-88 is used to store replacement information for ensuring that the least recently used information is replaced. For further details regarding the operation of LRU 40-84, reference may be made to the related patent application of Forrest M. Phillips entitled, "Least Recently Used Replacement Level Generating Apparatus."

As shown, the cache memory level 0 and 1 chips 40-80 and 40-82 connect to a pair of data buses PD0DAT and PD1DAT which receive data from a pair of input data registers PD0DAT1 and PD1DAT1, respectively. The PD0DAT and PD1DAT registers connect to the VMBUS section 40-14, as shown.

Section 40-8 includes a plurality of PAL devices 40-89 which generate chip enable and read/write control signals for cache memory chips 40-80 and 40-82, in addition to a pair of mutually exclusive register enable signals D for registers 40-22 and 40-66, as shown. The PAL devices 40-89 receive control signals from control logic section 40-30 as described in greater detail herein.

SDASM SECTION 40-10

The section 40-10 of FIG. 2b stores the segment descriptors (SEG DESC) and quadrant descriptors (DSPT) and a descriptor segment base register (DSBR) in a RAM 40-100. A segment descriptor RAM 40-100 which can be viewed as a single level cache has sufficient capacity for storing all of the required number of segment descriptors. More specifically, SDRAM 40-100 includes locations for storing displacement pointers (DSPT), quadrant descriptors, and a descriptor base register (DSBR) value used for generating addresses for referencing main memory to fetch required quadrant and segment descriptors in response to a miss condition. The SDRAM 40-100 also includes circuits for detecting a quadrant descriptor hit (QDHIT). A PAL device 40-104, in response to signals from control logic section 40-30, applies read/write control signals to SDRAM 40-100.

Section 40-10 also includes a comparator chip 40-102 which is connected to receive segment number signals from PTRBUS 40-16 and a segment valid bit signal SDVBIT from VMBUS 40-14. Comparator chip 40-102 generates a segment descriptor hit signal SDHIT for indicating the presence of the segment descriptor in SDRAM 40-100. A PAL device 40-108 generates a quadrant descriptor hit signal QDHIT, as shown.

The SDHIT and QDHIT signals are also applied as status inputs to control logic section 40-30. Section 40-10 also includes a segment address SAD register 40-106 which is constructed from PAL devices. The register 40-106 can be clocked early in a cycle with address signals from either PTR bus 40-16 or A-unit 20-4, in response to GOTO signals received from control logic section 40-30, as discussed later herein.

FIFO SECTION 40-12

Section 40-12 of FIG. 2b provides E-cache 60-4 with signals from one of four sources as directed by control signals from control logic section 40-30. As shown, section 40-12 includes a 4-way multiplexer 40-120, 32-bit output latch 40-122 which connects to a V-PTR interface bus and a 16×32 bit FIFO buffer circuit 40-124 for storing information received from latches 40-122 when the E-cache 60-4 signals that it is busy as indicated by the state of E-cache ready signal EC-RDY.

Multiplexer 40-120 has as inputs, the current input pointer and ring number from register 40-20 and PTRBUS 40-16, the output of PDASM level 0 RAM 40-80 and the least significant ten bits of the current pointer from PTRBUS 40-16, the output of PDASM level 1 RAM 40-82 and the least significant ten bits of the current pointer from PTRBUS40-16 and the VMBUS 40-14. In addition to receiving information from one of the sources selected by multiplexer 40-120, latch circuits 40-122 also receive a 4-bit E-cache command (C) generated by control logic section 40-30, in response to the required operation.

SECTIONS 40-14 THROUGH 40-19

Section 40-14 includes the VMBUS which receives 32-bit input data from the E-cache data bus EC-BUS via input register 40-140 enabled by a signal E received from control logic section 40-30. This is done in response to a read descriptor request made by VMU40 when missing descriptors are required to be fetched from main memory. The VMBUS also receives status signals from section 40-19. The VMBUS, as mentioned, provides data to the different VMU sections, such as sections 40-8, 40-10 and 40-12. Section 40-16 includes the PTR bus which receives the current virtual address or pointer from A-unit 20-4.

An exception vector generator section 40-18 of FIG. 2c includes a number of PAL devices which, in response to signals from control logic section 40-30, generates a 5-bit code V-VECT identifying the type of exception which occurred during normal processing. It identifies both VMU exceptions and trap codes passed to the VMU40 by A-unit 20-4. The V-VECT code is deemed valid when the VMU40 sets a V-VECT valid indicator signal V-INT to a binary ONE or active state.

A status section 40-19 of FIG. 2c stores indicator information in a status register 40-194 for signalling error checking violations which result in certain traps or page faults, in addition to VMU status information. The error checking indications include gate permit OK, gate bracket OK and gate SIZEOK signals, process and segment boundary violation signals, write and read permission allowed signals. The VMU status information signals include paged segment signal, security alarm signal, READOK, WRITEOK, SIZEOK and read/write bounds OK signals. As shown, section 40-19 includes a group of PAL devices 40-190 which, in response to carry out signal CN12 and STATE signals from section 40-30, generate SIZEOK signal, in addition to the other status signals mentioned.

CONTROL LOGIC SECTION 40-30

Section 40-30, in response to the 8-bit VMU command signals from A-unit 20-4 applied via command register 40-26 and status signals applied from the different VMU sections, generates the necessary subcommand signals required for carrying out the operation specified by the A-unit 20-4. The section 40-30 is constructed according to the teachings of the present invention which employs a state machine concept. As shown in FIG. 2c, section 40-30 includes a state control unit 40-32 which generates signals STATE00-5 specifying the current state and signals GOTO0-5 specifying a next state. The signals GOTO0-5 are applied as inputs to a clocked PAL device 40-36 which generates output register enable signal E which is applied to register 40-140. Both sets of signals are applied as inputs to the PAL devices which comprise a subcommand generator block 40-34. The block 40-34 provides as outputs, subcommand signal groups corresponding to outputs A through M. As shown, outputs A through M are either used directly or applied to PAL devices shown as distributed throughout the VMU sections. These PAL devices form part of subcommand generator block 40-34. These PAL devices, as well as the PAL devices included in block 40-34, are for the most part distributed throughout VMU40.

Figure 3:
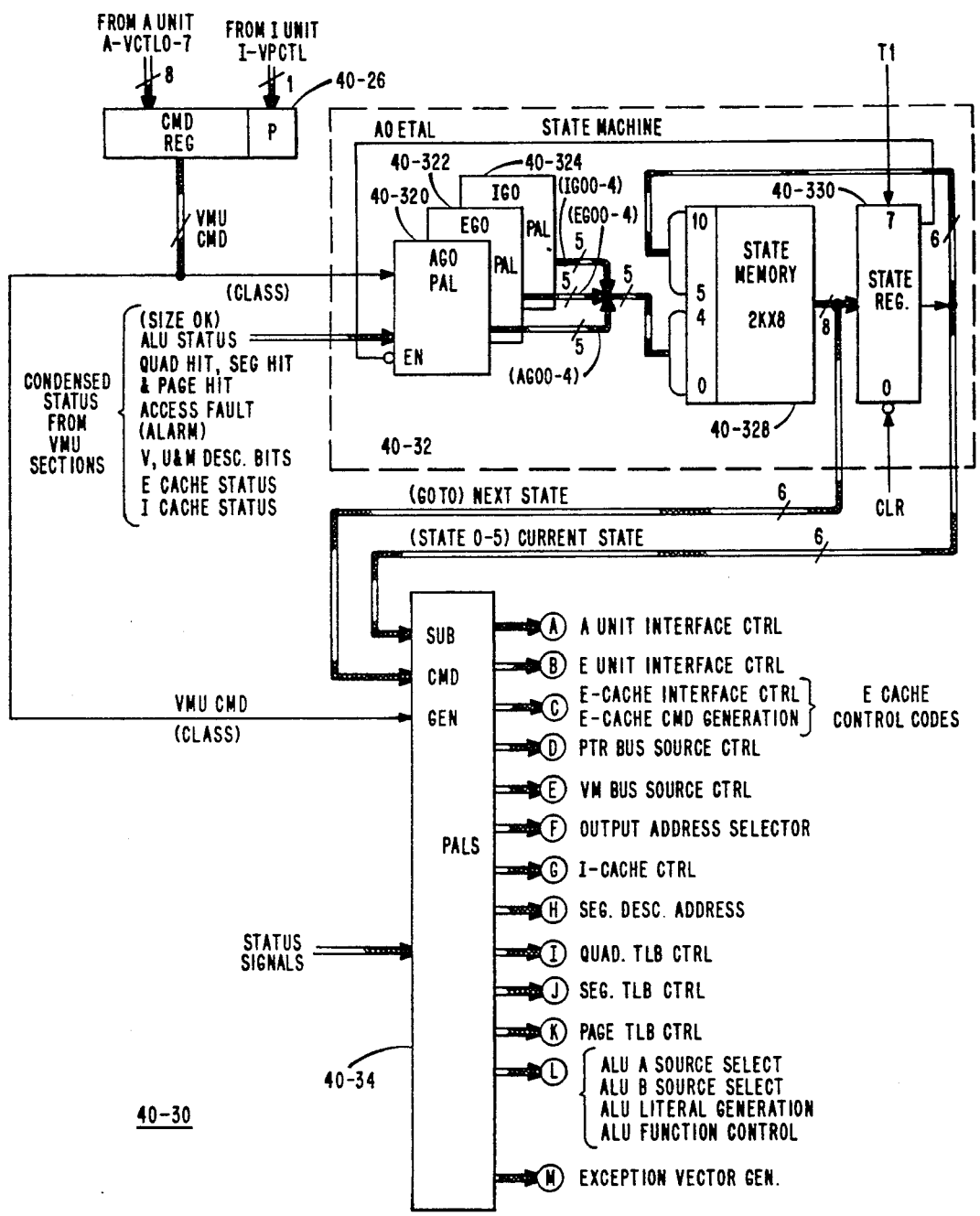
FIG. 3 shows in greater detail, the state machine apparatus of FIG. 2a, 2b and 2c.

FIG. 3 shows in greater detail, state control unit 40-32 implemented according to the teachings of the present invention. As seen from FIG. 3, unit 40-32 includes three PAL devices 40-320, 40-322 and 40-324, a 2K×8-bit state memory 40-328 and a state register 40-330 connected as shown. Each PAL device receives a consolidated set of status signals from the different VMU sections. The PAL devices 40-320, 40-322 and 40-324 also receive signals from VMU command register 40-26 which specify the type of operation to be performed by VMU40. The outputs of each PAL device connect in common to a bus which applies a 5-bit address input code to a state memory 40-328, as shown.

In the preferred embodiment, the VMU40 is required to execute commands received from A-unit 20-4. Additionally, VMU40 also provides support to three other units. It supports the E-cache 60-4 by providing it physical (real) addresses (pointers) and commands. It supports the I-cache unit 60-2 by providing it with page frame numbers (PFN)s which are used by I-cache 60-2 to map procedure virtual addresses to physical addresses in parallel with other VMU operations. Also, VMU40 supports E-unit 20-6 by providing it with effective ring number (V-REF) information, data and function code information. Separate PAL devices are used to process status conditions relating to A-unit operations, E-cache/unit operations and I-unit operations to the extent possible. Obviously, there are status conditions or signals which overlap in the case of certain operations. The particular sets of input signals applied to PAL devices 40-320, 40-322 and 40-324 are listed in sections III, IV and V of the Appendix where the PAL devices are labeled AG0, EG0 and IG0.

The AG0 PAL device 40-320 defines when the state machine remains in a high performance state designated as state A0. This PAL device receives the various hit signals (PHIT0, PHIT1, DSPTHIT, SEGHIT) and M bit signals (PD0DAT20, PD1DAT20) from VMU sections 40-8 and 40-10, the access fault (ALARM) signal from section 40-4 and an ALU status signal CN12 from ALU section 40-6. It also receives three bits (CLASS0-2) corresponding to decoding the VMU command from A-unit 20-4, in addition to a WRITE signal derived from the fact that the VMU command is a write type of command and an XLATE signal which is derived from the fact that VMU40 is operating in a translate mode and that the VMU command is one which invokes translation.

The AG0 PAL device 40-320 requires a limited number of current state information signals STATEL0 and STATEAX. Also, AG0 PAL device 40-320 receives an enable input signal AG0ENB derived from the current state contents of state register 40-330. In the preferred embodiment, this corresponds to the state of one of the bit positions (A0ETAL) of state register 40-330 which is in addition to the 6-bit positions which store the current state code corresponding to signals STATE0-5. The AG0 device 40-320 applies as outputs, signals AG00 through AG04 to the input bus as signals HTRN0 through HTRN4. PAL device 40-320 also produces an output AXT0A1 which denotes the occurrence of a certain state transition sequence useful to the operations of another pipeline stage within the system.

The EG0 PAL device 40-322 generates 5-bit codes related to E-cache operations. It receives signals derived from special decoding of certain exception type commands. These signals correspond to signals HOTOA and HOTOB. Signals HOTOA and HOTOB indicate receipt of a cancel exception which are acted upon even when VMU40 is busy. Signal HOTOB causes the return of status to the A-unit, while signal HOTOA does not. Signals HOTOA and HOTOB specify the codes for the two cancel VMU commands. Early E-cache ready signal EARDY, a word hold signal VMROP and a FIRST signal are provided by E-cache 60-4 as inputs. These signals allow a VMU next state transition to be chosen as a function of the state of E-cache 60-4.

PAL device 40-322 receives the SIZEOK signal from status section 40-19 which represents the history of the state of carry 12-bit signal from ALU section 40-6. Signal SIZEOK indicates the result of performing a check on the size of the reference as it was found to be OK. That is, the page number was within the segment bounds, the segment number was within the process, etc. The status signal FEMPTY is applied to EG0 PAL 40-322 from section 40-12. This signal defines the empty state of the FIFO buffer 40-124. The EG0 PAL 40-322 also receives from E-cache 60-4, further status signals WRTHOLD and FIRST.

It will be noted that the EG0 PAL 40-322 receives as inputs state signals STATE0 through STATE5 which it decodes to internally generate an enable signal EG-0ENB. Thus, two passes are required to be made through the PAL, one for determining whether or not it should be enabled and the second pass during which it is enabled. This is done in lieu of expanding the width of state memory 40-328 to include an extra bit as was done in the case of AG0 PAL device 40-320. EG0 PAL device 40-322 applies as outputs, signals EG00 through EG04 to input bus as signals HTRN0 through HTRN4.

The IG0 PAL device 40-324 generates 5-bit codes related to I-cache operations. It receives as inputs, signals VMBUS0 through VMBUS2 which are used when VMU40 is fetching a descriptor from main memory. When a segment descriptor is being checked, it is placed on the VMBUS 40-14. The VMBUS0 corresponds to the valid (V) bit while VMBUS1 and 2 are used to determine the states of the used (U) and modify (M) bits of the page descriptors. The signals PTR-19, IADRS19Q and PDMISS provide information related to I-cache operations. These signals allow the VMU40 to determine whether I-cache 60-2 needs help and if it is an operation the VMU40 can perform. That is, the signals PTR19 and IADR819Q let VMU40 determine if the I-cache address translation miss occurred on the base address. The signal PTR19 is provided by the A-unit 20-4 from the base address or the incremented address while signal IADR819Q is provided by the I-cache 60-2 which may have been changed by the incrementation process.

The IG0 PAL 40-324 also receives an ICLASS signal which is derived by decoding the VMU command, in addition to other decoded signals CUPVLD and WRITE. IG0 PAL 40-324 is enabled by internally generated signal IG0 ENB derived from decoding state signals STATE0 through STATE5 in a manner similar to the enabling of EG0 PAL 30-322. IG0 PAL 40-324 applies as outputs, signals IG00 through IG04 to the input bus as signals HTRN0 through HTRN4.

The PAL devices 40-320 through 40-324 utilize standard parts, such as 22V10 chips. Each PAL is programmed in a conventional manner according to the logic equations set forth in the Appendix.

As previously discussed, the state memory 40-328 is a 2K×8-bit memory. The memory 40-328 receives as a first set of address inputs, signals HTRN0 through HTRN4 from the input bus. The state signals STATE0 through STATE5 from state register 40-330 are applied as a second set of address inputs. The state memory 40-328, in response to the 11-bit address, applies as outputs, signals GOT00 through GOT05, enable signal AOETAL and a state bad signal STATEBAD. These eight signals are loaded into state register 40-330, in response to a system clock signal T1. The generation of states, according to various input status signals, are set forth in the Appendix.

In the disclosed embodiment, the memory is a programmable read only memory (PROM) constructed from a standard chip designated as 7C291A. However, it is appreciated that a random access memory (RAM) chip could also have been used which would facilitate making changes. This requires apparatus for writing which is unnecessary for this application.

As shown in FIG. 3, state register 40-330 applies the current state signals STATE1 through STATE5 as inputs to the PAL devices of subcommand generator 40-34. In response to these signals and VMU command signals from register 40-26, the circuits generate the control signal groups designated as A through M which are applied to the VMU sections of FIG. 2. The state register 40-330 is implemented using standard D-type flip-flops. The next state signals GOT00 through GOT05 are distributed as inputs to certain PAL devices for registration therein, in response to system clock signal T1.

DESCRIPTION OF OPERATION

The operation of the state machine control unit 40-32 will now be described with reference to the flow and timing diagrams of FIGS. 4 and 5.

Figure 4:
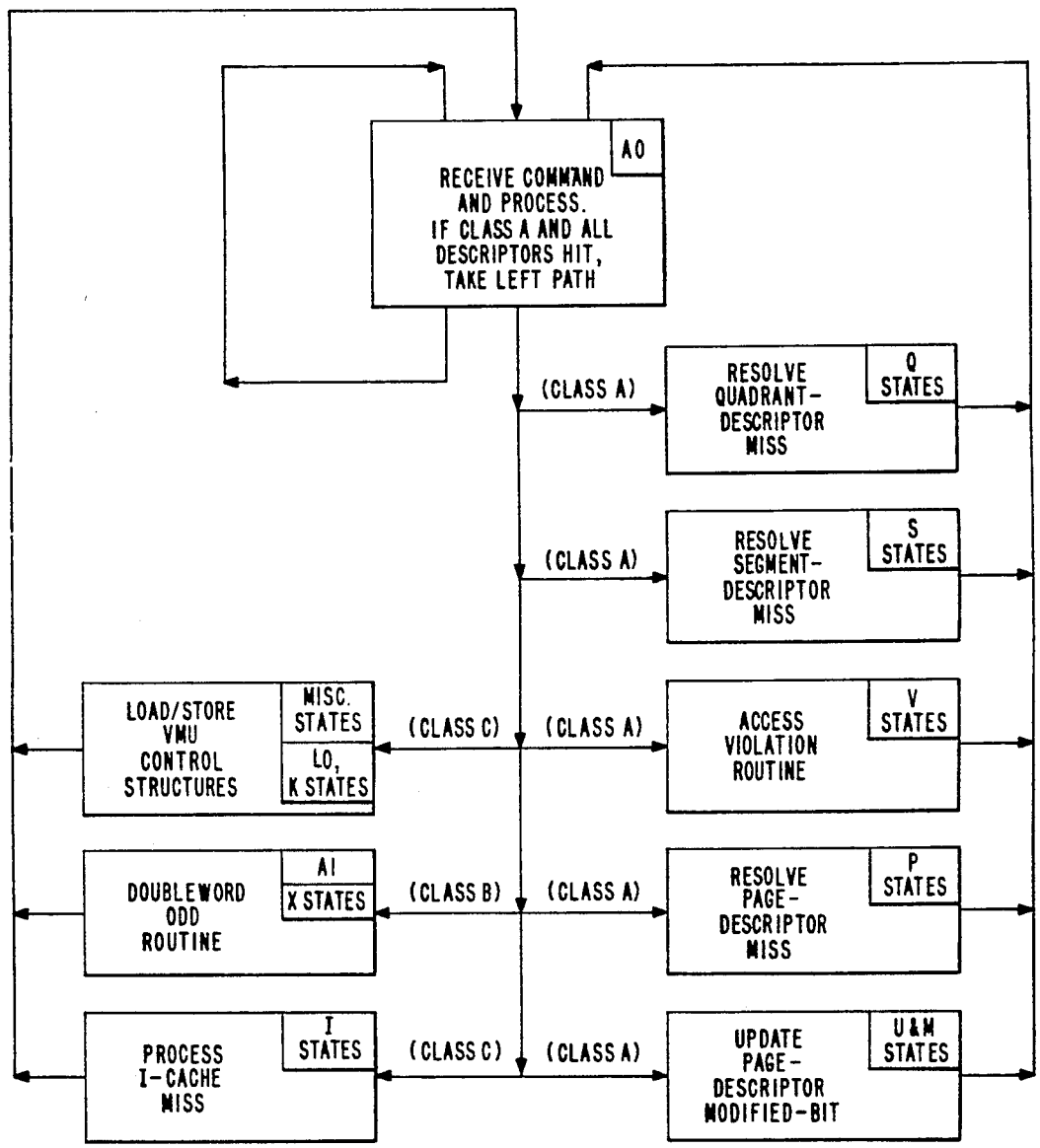
FIGS. 4 and 5 are flow and timing diagrams, respectively, used to explain the operation of the preferred embodiment of the present invention.

Before referring to FIG. 4, it will be noted that the VMU commands have been classified according to both their complexity and their urgency in terms of impact on overall system performance. More specifically, the state machine was designed so that commands which were designated "class a" are those which are to be completed within one cycle of operation if all the required information is available (e.g. quadrant, segment and page descriptors present and valid), there are no alarms raised (e.g. permissions, ring checks, etc.) and no E-unit help is needed. Thus, in the normal case VMU40 could translate a virtual address into a physical address, perform access rights checking and send the translated address along with the appropriate command to the E-cache to read the specified memory location and send the data contents to E-unit. In such cases, the state machine would never leave a particular state, A0, as explained herein.

The commands classified "class b" are those which are to be completed within two cycles provided all the required information is present, there are no alarms raised and no E-unit help is required. The commands classified "class c" are those which are not allowed to interfere with the speed and efficiency of class a and b commands. Those class a and b commands requiring a level of indirection were classified as "class i." Commands which are unsupported were classified "class u." The Appendix provides a list of VMU commands along with their classifications.

Consistent with the above classification of VMU commands, the overall sequencing of state machine 40-32 of FIG. 3 is established to maximize system performance through the hierarchical organization of states illustrated in FIG. 4. Almost all of the VMU command specified operations normally will be executed or processed by cycling through a single state, A0. VMU40 continues to sequence through state A0, until the VMU command being processed encounters one or more difficulties requiring more than one state (cycle) to process.

As seen from FIG. 4, the boxes to the right side of the drawing represent the number of difficulties which can occur. These include encountering a missing quadrant descriptor, missing segment descriptor, access violation, missing page descriptor or updating the page descriptor modified (M) bit. Thus, VMU40 could be required to sequence through up to four of the indicated state groups (i.e., Q, S, P and M states). Such sequencing occurs in the case where the quadrant, segment and page descriptors are missing and the VMU command specifies a write operation requiring the updating of the M bit.

The boxes on the left side of the drawing indicate those situations in which at least two states are required to complete the VMU command. For example, one such case is where the VMU command specifies a read double word but the address is odd. The E-cache is unable to handle the operation as a single transaction in which it reads a 32-bit word starting at an odd word address. In this case, VMU40 provides the E-cache with two commands (read first word, read second word) and performs the incrementing of the virtual address via the adder and increment register of section 40-6. This requires an extra state (i.e., state A1) to perform the double word odd routine for processing the VMU incremented virtual address.

The state A1 is sequenced through in some cases, such as where the incremented virtual address lies within the same page. A further refinement of this case is where VMU40 detects in state A0 when the incrementing operation takes place that the adder generated a carry out signal indicating a page crossing by having incremented the address into a new page. This in turn causes VMU40 to sequence through different states, starting with X0 or X1, in which case it delays sending commands to the E-cache as in the nonpage crossing case until the incremented address passes all checks.

The VMU40 examines the virtual address and if it determines that it is translatable, it is required to verify access rights to the second page before processing the address. This results in the VMU40 sequencing through states X1 through X3 which perform operations similar to those performed for the unincremented address. The only difference between the X states and state A0 is that instead of applying the virtual pointer register to the PTRBUS, it is the contents of the PLUS register which are applied to the PTR bus. Hence, the incremented virtual address is translated and its access rights checked and, in the case of a segment descriptor miss, its segment descriptor is fetched from main memory. In the simpler case, VMU40 sequences through states X2 and A1 for issuing a read first command to the E-cache during state X2 and for issuing a read second command to E-cache during state A1.

The different blocks of FIG. 4 are set out in greater detail in section VII of the Appendix. In the case of each flow chart, each block represents a 140 nanosecond cycle of operation. It will be seen that the most lengthy subsequence requires 10 cycles in order to go to main memory and obtain a 64-bit segment descriptor and store it away in response to a segment descriptor miss.

Summarizing the above, it is seen that when VMU40 is in state A0 (the "normal" state) and the VMU command register 40-26 contains a "class a" command, state machine 40-32 must determine within a minimum amount of time (less than 70 nanoseconds) whether any difficulties have been encountered. This is due to the need to signal the A-unit by mid-cycle whether the VMU40 requires additional cycles to process this command. This involves checking for possible page boundary effects, for the presence of all necessary descriptors (DSPT, SD and PD), for the validity of such descriptors, the access rights and ring brackets appropriate to the requested reference, etc. The state machine 40-32 is so designed that it is not distracted by conditions which do not apply to "class a" commands. This is achieved in part by the careful selection of input status signals applied to AG0 PAL device 40-320. Commands that require the investigation of unusual conditions do not come within the "class a" grouping.

When a "class a" command encounters no difficulties, the subcommand generator 40-34 generates a V-RDY signal corresponding to output A to the A-unit, generates whatever addresses and other control signals are appropriate to the command and reloads input registers of section 40-2 with the next command, etc. When the "class a" command encounters a difficulty, state machine 40-32 makes a transition from state A0 to the start of a sequence of states (as many as needed) designed to overcome the difficulty. Upon the successful completion of the sequence, state machine 40-32 returns to state A0, but without reloading the input registers of section 40-2. The processing of this command is then retried with the updated descriptors.

Similarly, when a "class b" command encounters a difficulty (e.g. a missing descriptor on the second half of an nonaligned double word), it causes the state machine 40-32 to detour through the state sequence allocated for processing the difficulty, then returns to state A0 without reloading the registers of section 40-2. It is possible to classify certain commands, such as a CVP support command with "class b" commands for expediency in translating the virtual address which causes a diversion when its descriptors have been found.

Class c commands whose execution depend on a variety of multiplexer, selections, chip enables, and ALU controls which are foreign to the requirements of the "class a" and "class b" commands cause state machine 40-32 to detour to suitable state sequences (e.g. miscellaneous states Kx, Lo) off the main path.

As indicated above, the overall requirement is to allow the VMU to complete normal operations within a single cycle of operation so as to maximize system performance.

Figure 5:
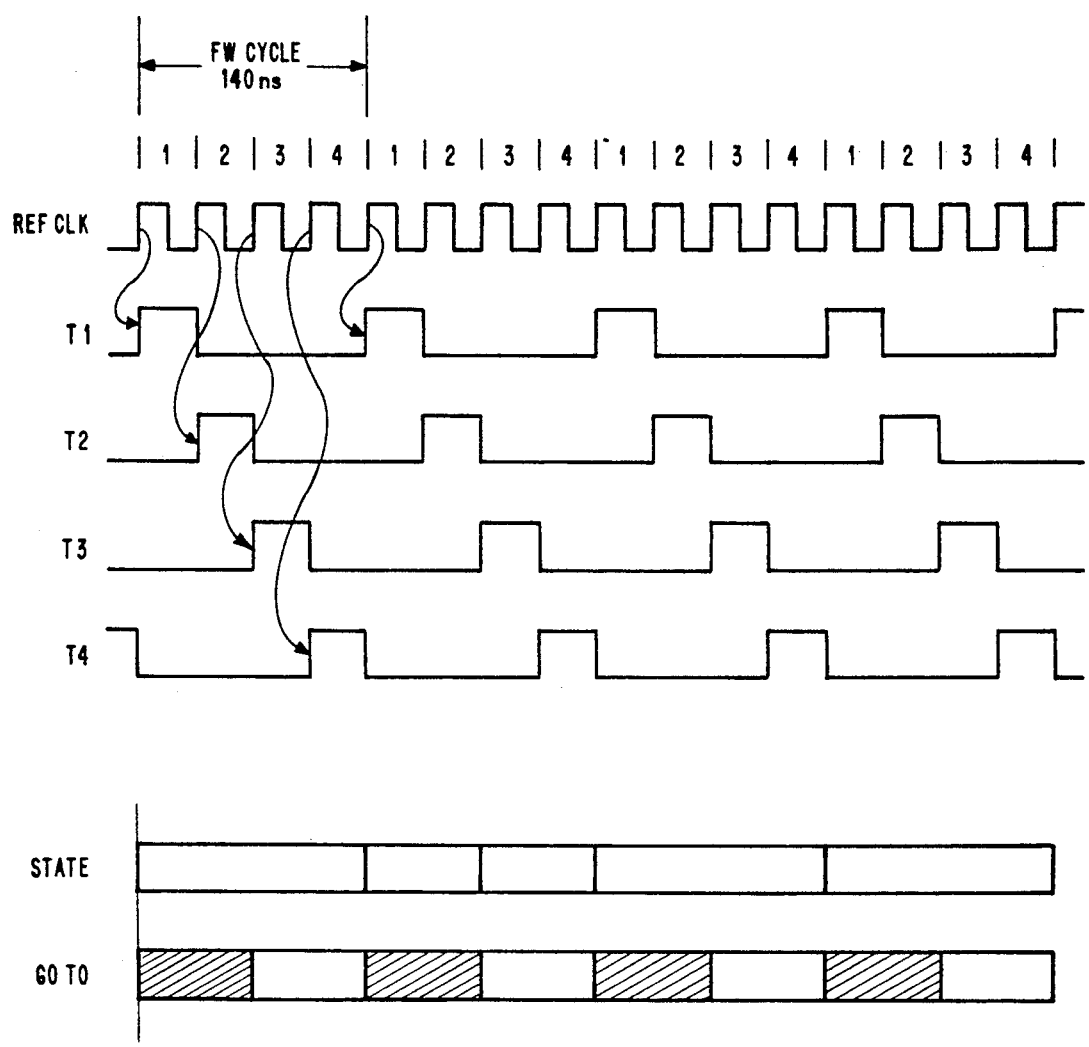

FIG. 5 illustrates the overall timing of the system of FIG. 1. As shown, a cycle has an overall time period of 140 nanoseconds. Initially, on power up, the contents of various registers, including state register 40-330, are cleared to ZEROS by the signal CLR. This places state machine 40-32 in its initial or normal state A0. At the beginning of each cycle (T1), the A-unit VMU command is clocked into the registers of input section 40-2.

Following the receipt of the VMU command, the state machine 40-32 determines within a 70 nanosecond period (i.e., before T3) if there are any difficulties encountered. During that time, AG0 PAL device 40-320 is enabled and the consolidated group of status signals, in addition to the class 0-2 signals defining the type of command, are used to assess the presence of difficulties. For example, as discussed previously, if a carryout of ALU section 40-6 occurs as the result of performing an increment operation, this causes AG0 PAL device 40-320 to apply other than an all ZEROS for signals AG00-4 to the input of state memory 40-328. This in turn causes state memory 40-328 to address either the location storing the code for state X0 or the location storing the code for state A1.

The contents of the state memory location are read out and correspond to the next state signals GOTO1-5. These signals are applied to different ones of the clocked PAL devices of FIG. 2 in the cycle. These PAL devices, for example, predecode or select the sources of the PTR bus and VMBUS for the next state. When the state machine determines that there are no difficulties, the subcommand generator 40-34 generates an output code for group A to the A-unit interface. This code forces signals V-RDY to an active or binary ONE state which, in turn, signals A-unit 20-2 that VMU 40 is able to accept another command. Upon the occurrence of the next T1 signal, the binary code contents of the addressed memory location are loaded into state register 40-330.

It will be appreciated that when AG0 PAL device 40-320 provides an all ZEROS address signalling that all status signals are ZEROS, this results in the addressing of location 0 of state memory 40-328. If the status input is "00001," then location 1 of state memory 40-328 is addressed. For example, assume that VMU40 is in state Q1. While in this state, ALU section 40-6 performs a computation relating to the checking of the size of the segment descriptor which results in the state of the carryout signal CN12 being stored in the SIZEOK register flip-flop during the cycle. During state Q1, EG0 PAL device 40-332 is enabled. During the next cycle or in the next state while VMU40 is performing operations relative to accessing main memory, the state of the SIZEOK signal is checked by EG0 PAL device 40-332. If it is inactive, the state memory 40-328 sequences to state V0, a precursor to generating a trap.

If the state of the SIZEOK signal is active, the state memory 40-328 sequences to state Q2. That is, during state Q1, the EG0 PAL device 40-332 is enabled and it controls the state of the input bus and signals HTRN0-4. The composite address (corresponding to the 5-bit coded signals and the combination of the 6-bit code STATE0-5 in state register 40-330 representing the state Q1) is used to access state memory 40-328 to read out the binary code representing state Q2. The state of signal SIZEOK as seen from the equations of the EG0 PAL device 40-322 defines the state of signal HTRN3. If it is active and VMU40 is in state Q1 or S1, this results in an address of 00010 at the output of EGOPAL device 40-322. If signal SIZEOK is inactive, this produces an address of 00000.

Thus, an 11-bit composite address consisting of either location 2 or 0 plus the six current state bit code corresponding to state Q1 (binary 11) is used to access state memory 40-328. When the contents of these state memory locations are read out, they define either state Q2 or V0. This can be seen from the equations for state memory 40-328 in Appendix Section VI. The equations and flow charts in the Appendix set forth the state transitions and various sequences.

From the above, it is seen how the state machine is able to ensure that the normal operations of VMU40 are performed so as to maximize the speed at which the production line operations are performed by the different stages.

APPENDIX

I. VMU Command (A-VCTL) Decode

A. VMU Operations where:

| A - VCTL(0_1)=00....A-VCTL(2_7)<br>23 4567 | Hex<br>Code | CLASS |
|---|---|---|
| NOP.................. 00 0000 | 00 | a |
| READ SW - NO TRANS-<br>LATE - NO CHECK.... 00 0010 | 02 | a |
| READ DW - NO TRANS-<br>LATE - NO CHECK.... 00 0011 | 03 | a/b |
| LOAD DSBR 0-31<br>[LDSBR]............. 00 0100 | 04 | c |
| LOAD DSBR 32-63<br>[LDSBR]............. 00 0110 | 06 | c |
| WRITE SW - NO TRANS-<br>LATE - NO CHECK.... 00 1000 | 08 | a |
| WRITE DW - NO TRANS-<br>LATE - NO CHECK.... 00 1001 | 09 | a/b |
| CANCEL EXCEPTION.... 00 1010 | 0A | c |
| CANCEL EXCEPTION and<br>READ VMU STATUS.... 00 1011 | 0B | c |
| LOAD DSPT 0......... 00 1100 | 0C | c |
| READ SW - NO ACCESS<br>CHECKS............. 01 0010 | 12 | a |
| READ DW - NO ACCESS<br>CHECKS............. 01 0011 | 13 | a/b |
| OUTPUT DSBR 0-31<br>[STDSBR]............ 01 0100 | 14 | c |
| OUTPUT DSBR 32-63<br>[STDSBR]............ 01 0110 | 16 | c |
| WRITE SW - NO ACCESS<br>CHECKS............. 01 1000 | 18 | a |
| WRITE DW - NO ACCESS<br>CHECKS............. 01 1001 | 19 | a/b |
| READ VMU SYNDROME<br>REGISTER........... 01 1010 | 1A | c |

| | | | |
|---|---|---|---|
| READ VMU STATUS (ONLY)............ | 01 1011 | 1B | c |
| READ DSPT at VAD(0_1)............ | 01 1100 | 1C | c |
| SECURITY CHECK [VLD] (PASS VA).... (No VINT for access or segment violation) | 10 0010 | 22 | c |
| TRANSLATE AND PASS (NO CHECK)......... | 10 0100 | 24 | a |
| CVP instruction SUPPORT............ | 10 0101 | 25 | c |
| TRANSLATE AND PASS w/READ CHECK....... | 10 0110 | 26 | a |
| TRANSLATE AND PASS w/WRITE CHECK...... | 10 0111 | 27 | a |
| GATE CHECK SUPPORT (VINT IF ACCESS DENIED)............ | 10 1000 | 28 | c |
| OUTPUT SD UPPER (0_31)............. | 10 1010 | 2A | c |
| OUTPUT SD LOWER (32_63)............ | 10 1011 | 2B | c |
| GET I-CACHE PFN..... | 10 1100 | 2C | c |
| Segment RAM FLUSH [ITP].............. | 11 0010 | 32 | c |
| Page Associator FLUSH [ITP].............. | 11 0100 | 34 | c |
| Segment RAM CLEAR Single Entry [ITP]. | 11 0110 | 36 | c |
| Page Associator CLEAR Single Entry [ITP]. | 11 1000 | 38 | c |
| Clear ACD (VMU & CACHE) SYNDROME registers.......... | 11 1101 | 3D | c |
| Clear Both CACHES and VMU FIFO........... | 11 1110 | 3E | c |
| TOGGLE ERROR ENABLE FLOP.............. | 11 1111 | 3F | c |

B.  Normal Operands where:

| A-VCTL(0_1)=01.. A-VCTL(2_7) | Hex Code | CLASS |
|---|---|---|
| PASS (Address directly to E-UNIT).............. 00 0000 | 40 | a |
| READ SW............. 00 0010 | 42 | a |
| READ DW............. 00 0011 | 43 | a/b |
| READ SW w/READ and WRITE CHECK........ 00 0100 | 44 | a |
| READ DW w/READ and WRITE CHECK........ 00 0101 | 45 | a/b |
| WRITE SW............ 00 1000 | 48 | a |
| WRITE DW............ 00 1001 | 49 | a/b |
| READ/WRITE SW....... 00 1010 | 4A | a |
| READ/WRITE DW....... 00 1011 | 4B | a/b |
| READ MODIFY WRITE SW w/LOCK............. 00 1110 | 4E | a |
| READ DW for INDIRECT ADDRESSING......... 01 0011 | 53 | a/bi |
| READ for REMOTE DATA DESCRIPTION (SW)... 01 0101 | 55 | ai |
| I/O OPERATION for BIU (NO V-LDREF by VMU)................ 10 iiii | 6i | c |
| (I/O Operation is specified in ADDRESS.) | | |
| PASS TRAP CODE (causes exception). 11 xxxx | 7x | c |
| (Trap code is found in ADDRESS.) | | |

C.  V-VECT(0_4) decodes.

| | EXCEPTION TYPE (VMU EXCEPTIONS) | | DECODE | RESET BY |
|---|---|---|---|---|
| 00 | SET PD USED BIT................ | | 0 0000 | FIRST by E-CACHE 3200# |

| | | | |
|---|---|---|---|
| 01 | SET PD USED AND MODIFIED BITS..0 | 0001 | FIRST by E-CACHE 3208# |
| 02 | PAGE FAULT (PD VALID BIT IS OFF)............................0 | 0010 | A-VCTL by E-UNIT 3210# |
| 03 | RFU..........................0 | 0011 | |
| 04 | TRAP 14-SECURITY CLEARANCE DENIED........................0 | 0100 | A-VCTL by E-UNIT 3220# |
| 05 | TRAP 34-SEGMENT VIOLATION......0 | 0101 | A-VCTL by E-UNIT 3228# |
| 06 | TRAP 36-GATE ACCESS DENIED....0 | 0110 | A-VCTL by E-UNIT 3230# |
| 07 | RFU..........................0 | 0111 | |
| 08 | INDIRECT ADDRESS is READY......0 | 1000 | A-VCTL by E-UNIT 3240# |
| 09 | REMOTE DATA DESCRIPTOR is READY........................0 | 1001 | A-VCTL by E-UNIT 3248# |
| 0A | PAGE FAULT for I-cache PD & RA-DONE1....................0 | 1010 | A-VCTL by E-UNIT 3250# |
| 0B | PAGE FAULT for I-cache PD & RA-DONE1....................0 | 1011 | A-VCTL by E-UNIT 3258# |
| 0C | TRAP 14 - NO EXEC PERMIT & RA-DONE1....................0 | 1100 | A-VCTL by E-UNIT 3260# |
| 0D | TRAP 34 - SEG VIOL I-CAC PD & RA-DONE1....................0 | 1101 | A-VCTL by E-UNIT 3268# |
| 0E | TRAP 14 - NO EXEC PERMIT & RA-DONE1....................0 | 1110 | A-VCTL by E-UNIT 3270# |
| 0F | TRAP 34 - SEG VIOL I-CAC PD & RA-DONE1....................0 | 1111 | A-VCTL by E-UNIT 3278# |

E. E-CACHE Tag (V-ECTL) decode.

| | V-ECTL(0_3) | Hex Code | CLASS N/A |
|---|---|---|---|
| PASS (Address directly to E-UNIT).............. | 0000 | 0 | |
| READ E-CACHE SYNDROME | 0001 | 1 | |
| READ................... | 0010 | 2 | |
| READ DESCRIPTOR (for VMU).................. | 0011 | 3 | |
| READ FIRST (16-31).... | 0100 | 4 | |
| READ SECOND (0-15).... | 0101 | 5 | |
| WRITE................. | 1000 | 8 | |
| READ/WRITE............ | 1001 | 9 | |
| READ/WRITE FIRST (16-31).............. | 1010 | A | |
| READ/WRITE SECOND (0-15)................ | 1011 | B | |
| WRITE FIRST (16-31)... | 1100 | C | |
| WRITE SECOND (0-15)... | 1101 | D | |
| READ/WRITE w/LOCK..... | 1111 | F | |

II. Description of Control Signals

VMU INPUTS

1. A-VPDAT(0_0) — Parity bit for A-VAD. — from A-UNIT

This bit represents odd parity for the 32-bit A-VAD input. It will arrive during the first half of the NEXT cycle after the pointer is loaded, i.e., during the first A0 state for each specific command, and is checked only once during that cycle. It is not registered.

2. A-VCTL(0_7) — 8-bit VMU Control. — from A-UNIT

The A-UNIT informs the VMU of the type of operation to be performed by passing this 8-bit instruction at the same time as V-VAD(0_31). It is registered at the beginning of the cycle for which it is to be used (see section below for decodes).

3. I-VPCTL(0_0) — Parity bit for — from A-UNIT
   A-VCTL.

This bit represents odd parity for the A-VCTL control code. It is passed to the VMU by the A-UNIT at the same time as A-VCTL, is registered, and is checked only once during the same cycle as A-VPDAT.

4. A-SNOK(0_0) — Segment Number OK — from A-UNIT
   for read.

The A-UNIT checks the pointer sent to the VMU against the Program counter and grants read permission if an executable segment is trying to read an operand from one of its own pages. This signal will override the READ permission bit in the segment's Access Control Word.

5. SET-PDMISS — Page Descriptor — from I-CACHE
   (0_0) Associative Memory MISS signal.

Signals that a Page Frame Number (PFN) required for address translation in the I-cache is missing. The VMU will generate the missing PFN and send it to the I-CACHE if an address is loaded by the A-UNIT along with an A-VCTL code requesting an I-CACHE PFN translation.

6. FIRST(0_0) — FIRST write cycle — from E-CACHE
   indicator.

This signal is monitored by the VMU during the "SET USED bit" or "SET USED and MODIFIED bits" sequences. During either of these operations, this signal indicates that the E-UNIT has set the USED or USED and MODIFIED bits of a Page Descriptor in the system's shared memory, while processing a VMU interrupt. When the VMU sees this signal during these operations, it turns off the V-INT line and stops interrupting the E-UNIT. The operation then continues to its next phase (see flow charts).

7. EC-BUS(0_35) - 32-bit VMU - from E-CACHE
   DATA input with
   byte parity.

32-bit input data from the E-CACHE data bus. This data is sent by the E-CACHE in response to a "Read Descriptor" request passed to the E-CACHE by the VMU when missing descriptors are required from the system's shared memory.

8. EC-DATVAL - EC-BUS Valid signal. - from E-CACHE
   (0_0)

This signal notifies the VMU that the descriptor it requested is on the EC-BUS and is valid. When this signal is seen by the VMU, and it is waiting for data, the VMU will load the data currently on the bus into an input register.

9. EC-RDY(0_0) - E-CACHE ReaDY - from E-CACHE
   signal.

This signal indicates that the E-CACHE is ready for inputs from the VMU and will take the next input stored in the FIFO or wait for input direct from the VMU. If the VMU has a pointer or data ready for the E-CACHE, and this signal is on, and the output FIFO is empty, the information will pass thru the output FIFO directly into the E-CACHE input register. If the FIFO is not empty, the E-CACHE will receive the next information from the FIFO, and the current information will be stored in the FIFO until its turn arrives. If this signal is off, current information will be stored in the output FIFO until the E-CACHE gets to it.

VMU OUTPUTS

10. V-PTR(0_31)    32-bit PoinTeR/Data.  - to E-CACHE

The Real Pointer translated by the VMU (right justified), or the Real Pointer passed directly from the A-UNIT (right justified), or an I/O channel number and function code from the A-UNIT, or bits 0-31 of any data which was requested by the E-UNIT from the VMU. This is the output from the FIFO, including information which was passed thru the FIFO without being stored there.

11. V-ECTL(0_3)   - 4-bit E-UNIT          - to E-CACHE
                    Control tag.

This control tag is used to inform the E-CACHE of the type of operation to be performed using the information in V-PTR. In order to keep things in the correct order, this code is stored (when necessary) with its associated data/pointer in the output FIFO (see decodes below). When V-PTR is a channel # and function code for the BIU, V-ECTL passes the right most four bits (bits 4-7) of A-VCTL.

12. V-VAL(0_0)    - VMU output Valid      - to E-CACHE
                    signal.

Indicates to the E-CACHE that the VMU has data for it. This signal is asserted if the output FIFO is not empty, or if the VMU has valid information for the E-CACHE and the FIFO is empty. If V-VAL is not asserted, then V-PTR and V-ECTL are invalid and must not be used.

13. V-RDY(0_0)  - 1-bit VMU ReaDY signal. - to A-UNIT

Signals A and I UNITs that the VMU is able to accept pointers and instructions. This signal is used to put the I and A-UNITs "on hold" when the VMU becomes busy, then it will be negated once the E-CACHE becomes ready. If deasserted due to an exception condition (e.g., a Page Descriptor is missing during pointer translation), then it will be negated until the VMU has successfully resolved the exception and completed the pending translation/operation. The negation of V-RDY causes the VMU to ignore further inputs from the A-UNIT.

Control problems in the A-UNIT and I-UNIT have required V-RDY to vary from the description above for certain operations. V-RDY will REMAIN ASSERTED when 1). V-OOPS is asserted as the result of a "Pass Trap Code" control code being input by the VMU from the A-UNIT; 2). V-OOPS is asserted as the result of a "Read Double Word for Indirect Addressing" command being input by the VMU from the A-UNIT; 3). V-OOPS is asserted as the result of a "Remote Data Descriptor Read" command being input by the VMU from the A-UNIT; --- For all of these cases, V-RDY has no meaning!

14. V-OOPS(0_0)  - "OOPS" signal (SERIOUS - to A-UNIT
                    EXCEPTION).

Signals A and I UNITs that the VMU has encountered an exception condition which will require E-UNIT intervention to resolve (a cancel exception code is required to end interrupt). If the VMU tries to resolve an exception, but is unable to (e.g., a page fault occurs), then this signal will notify the A and I-UNITs that the E-UNIT is about to take control of the A-UNIT in order to correct the situation. V-OOPS is negated by a special code on A-VCTL which is generated by the E-UNIT firmware (while controlling the A-UNIT).

15. ADDR(2_21)   - 20-bit Page Frame   - to I-CACHE
                   Number (PFN).

The Real Pointer of the Page Frame translated from the Virtual Pointer. This is only passed when an I-CACHE miss condition exists and the VMU is translating an address on behalf of the I-CACHE.

16. V-ASMWRT(0_0)  I-CACHE Associative  - to I-CACHE
                   Memory Write.

Causes the I-CACHE to write the Page frame number currently being passed, into its associator, and to capture V-ACTL and the PRIVileged bit.

17. V-ACTL(0_3)    4-bit Access Control  - to I-CACHE
                   Word.

This is the ACW from the SD for the PFN being passed to the I-CACHE. It is composed of:

PR - Privileged bit  V-IACW(0)
R1 - RING Bracket 1  V-IACW(1_2)    Set to 0 if "C"
R2 - RING Bracket 2  V-IACW(3_4)    is on.

18. V-FLUSH(0_0)   - Associator FLUSH    - to I-CACHE
                     signal.              and VMU
                                          PDAM This signal results from the processing of any flush command or by the LOAD-DSBR-UPPER command.

19. V-TAM(0_0)     - Translate Address   - to CACHEs
                     Mode indicator.

Indicates the current addressing mode based on the contents of the first double word of the DSBR. It is cleared by the LOAD-DSBR-UPPER command and set by the LOAD-DSPT0 command.

TAM asserted = Translate Address Mode (TAM).
TAM negated = Absolute Address Mode (AAM).

20. V-REF(0_1)   - 2-bit Ring Effective. - to E-UNIT

The ring number resulting from the check performed by the Security Checker in the VMU as requested by the A-UNIT via A-VCTL. These lines are valid only when V-LDREF is asserted. When V-LDREF is negated, these lines must be ignored (also used as the paged/unpaged indicator in the CVP command).

21. V-LDREF(0_0)   LoaD Ring Effective   - to E-UNIT
                   strobe.

Instructs the E-UNIT to load the ring number currently being output on V-REF. This signal is asserted once for each applicable operation requested of the VMU by the A-UNIT. In the case of a double word operation which results in two VMU cycles (crosses the double word boundary), this signal will be sent during the second cycle only. It will only strobe the E-UNIT when the VMU is causing an operand or data, which the E-UNIT is expecting, to appear at its data input. If an exception is being processed (e.g., SET USED bit), V-LDREF will *not* strobe the E-UNIT.

22. V-VECT(0_4)   - 5-bit VECTor to pass   - to E-UNIT
                    trap codes or indicate
                    the exception type.

This vector (see decodes below) identifies the type of exception which occurred during normal processing. It will identify both VMU exceptions, and trap codes passed to the VMU by the A-UNIT, and is not valid unless V-INT is also asserted. An exception occurs any time the E-UNIT is expecting data from either the E-CACHE or A-UNIT, but will receive a pointer (via a bypass path in the E-CACHE) from the VMU instead. This will happen if the VMU encounters a problem during normal pointer translation, or if the pointer passed to it from the A-UNIT is for either an Indirect address or for a remote data descriptor, or if the pointer passed by the E-UNIT is really a trap vector.

23. V-INT(0_0)   - V-VECT valid           - to E-UNIT
                   indicator.

This signal indicates that an exception has occurred (in either the I-UNIT, A-UNIT or VMU) and that V-VECT is valid.

III. Description of AGO PAL Signals

```
                      01    ---------------
        DSPTHIT+00    --->|     22V10     |
                      02   |               | 23
        SEGHIT+00     --->|               |<--- STATEL0+00
                      03   |               | 22
        ALARM+00      --->|               |---> AGO0+00 --> HTRN0+00
                      04   |               | 21
        PHIT0+00      --->|               |---> AGO1+00 --> HTRN1+00
                      05   |               | 20
        PHIT1+00      --->|               |---> AGO2+00 --> HTRN2+00
                      06   |               | 19
        PD0DAT-20+00  --->|               |---> AGO3+00 --> HTRN3+00
                      07   |               | 18
        PD1DAT-20+00  --->|               |---> AGO4+00 --> HTRN4+00
                      08   |               | 17
        CLASS0+00     --->|               |---> AXTOA1+00
                      09   |               | 16
        CLASS1+00     --->|               |<--- CN12-00
                      10   |               | 15
        CLASS2+00     --->|               |<--- STATEAX+00
                      11   |               | 14
        WRITE+00      --->|               |<--- AGOENB-00
                      13   |               |
        XLATE+00      --->|               |
                           ---------------
```

| AGO | meaning |     | AGO | meaning |
|-----|---------|-----|-----|---------|
| 0   | A_OK    |     | 8   | B_OK    |
| 1   | PAGEX   |     | 9   |         |
| 2   | WMISS   |     | A   | GO_L0   |
| 3   | IHLP1   |     | B   | IHLP3   |
| 4   | PMISS   |     | C   | GO_I0   |
| 5   | FAULT   |     | D   |         |
| 6   | SMISS   |     | E   |         |
| 7   | QMISS   |     | F   |         | except that in STATE L0 codes 0 - 7 represent the more significant nibble of the current CTL code.

D20

B. Inputs

```
  Pin No.                          Signal Description
  PIN  1 = DSPTHIT    ;    quadrant descriptor present
  PIN  2 = SEGHIT     ;    segment descriptor present
  PIN  3 = ALARM      ;    fault indication
  PIN  4 = PHIT0      ;    page hit
  PIN  5 = PHIT1      ;            level code
  PIN  6 = PD0DAT20   ;    page-descriptor
  PIN  7 = PD1DAT20   ;                    modified bit
  PIN  8 = CLASS0     ;    coded
  PIN  9 = CLASS1     ;            CTL
  PIN 10 = CLASS2     ;                classification
  PIN 11 = WRITE      ;    this command writes memory
  PIN 13 = XLATE      ;    this command translates address
  PIN 14 = !AGOENB    ;    enable this PAL
  PIN 15 = STATEAX    ;    treat as if class-a
  PIN 16 = !CN12      ;    carry at page boundary
  PIN 23 = STATEL0    ;    crazy state, change direction
```

C. Outputs

```
  Pin No.                          Signal Description

PIN 17 = AXTOA1     ;    now in state Ax, Ao, Aq, As, Ap, going
  PIN 18 = AGO4       ;    to A1
  PIN 19 = AGO3       ;
  PIN 20 = AGO2       ;
  PIN 21 = AGO1       ;
  PIN 22 = AGO0       ;
```

D. Declarations and Intermediate-Variable Definitions

```
C2 = CLASS0; C1 = CLASS1; C0 = CLASS2; FIELD CLASS = [C2..0] ;

PDHIT = PHIT0 # PHIT1 ;

MODOK = !WRITE
      # PHIT0 & PD0DAT20
      # PHIT1 & PD1DAT20
      ;

SPLAT = CLASS:[4..7]
      # CLASS:3 & !STATEAX ;

/* AGO */
/* 7 */ QMISS = SPLAT & XLATE & !DSPTHIT ;

/* 6 */ SMISS = SPLAT & XLATE & DSPTHIT & !SEGHIT ;

/* 5 */ FAULT = SPLAT & XLATE & DSPTHIT & SEGHIT & ALARM ;

/* 4 */ PMISS = SPLAT & XLATE & DSPTHIT & SEGHIT & !ALARM & !PDHIT ;

/* 3 */ IHLP1 = CLASS:5 & !XLATE
              # CLASS:5 & DSPTHIT & SEGHIT & !ALARM & PDHIT
              ;
```

```
/*  B  */ IHLP3 = CLASS:7 & !STATEAX & !XLATE
                # CLASS:7 & !STATEAX & DSPTHIT & SEGHIT & !ALARM & PDHIT
                ;

/*  2  */ WMISS = SPLAT & XLATE & DSPTHIT & SEGHIT & !ALARM
                           & WRITE & ( PHIT0 & !PD0DAT20
                                     # PHIT1 & !PD1DAT20 )
                ;

/*  1  */ PAGEX = CLASS:[6..7] & XLATE & DSPTHIT & SEGHIT & !ALARM & PDHIT
                           & CN12 & MODOK
                ;

/*  0  */ A_OK  = CLASS:4 & !XLATE
                # CLASS:4 & DSPTHIT & SEGHIT & !ALARM & PDHIT & MODOK
                # CLASS:1
                ;

/*  8  */ B_OK  = CLASS:[6..7] & !XLATE
                # CLASS:[6..7] & XLATE & DSPTHIT & SEGHIT & !ALARM & PDHIT
                           & !CN12 & MODOK
                ;

/*  A  */ TOL0  = STATEAX & CLASS:2 ;

/*  C  */ TOI0  = STATEAX & CLASS:3 ;
```

E. Logic Equations

```
[AGO4..0].OE  = AGOENB ;

AGO0    = 'H'0 ;

AGO1    = !STATEL0 & B_OK
        # !STATEL0 & IHLP3
        # !STATEL0 & CLASS:2 & ( ALARM # CN12 )
        # !STATEL0 & CLASS:0
        #  STATEAX & CLASS:[2..3]
        #  STATEL0 & 'B'0
        ;

AGO2    = !STATEL0 & QMISS
        # !STATEL0 & SMISS
        # !STATEL0 & FAULT
        # !STATEL0 & PMISS
        # !STATEL0 & CLASS:0
        # !STATEL0 & CLASS:2 & WRITE
        #  STATEAX & CLASS:3
        #  STATEL0 & CLASS0
        ;

AGO3    = !STATEL0 & QMISS
        # !STATEL0 & SMISS
        # !STATEL0 & IHLP1
        # !STATEL0 & IHLP3
        # !STATEL0 & WMISS
        # !STATEL0 & CLASS:2
        # !STATEL0 & CLASS:0
        #  STATEL0 & CLASS1
        ;

AGO4    = !STATEL0 & QMISS
        # !STATEL0 & FAULT
        # !STATEL0 & IHLP1
        # !STATEL0 & IHLP3
        # !STATEL0 & PAGEX
        #  STATEL0 & CLASS2
        ;
```

AXTOA1 = B_OK ;

(Where # = OR: ! = negation; and & = AND)

IV. EGO Signals

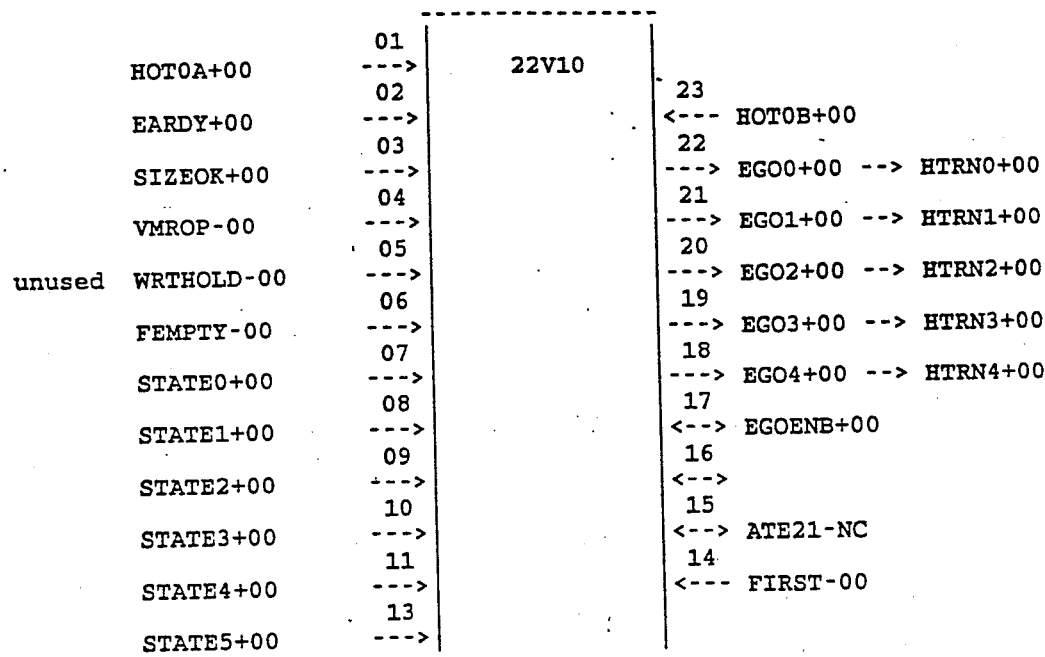

D21

```
/ Inputs /

PIN  1 =  HOTOA    ;   /*                                  */
PIN  2 =  EARDY    ;   /*                                  */
PIN  3 =  SIZEOK   ;   /*                                  */
PIN  4 = !VMROP    ;   /*                                  */
PIN  5 = !WRTHOLD  ;   /* unused                           */
PIN  6 = !FEMPTY   ;   /*                                  */
PIN  7 =  STATE0   ;   /*                                  */
PIN  8 =  STATE1   ;   /*                                  */
PIN  9 =  STATE2   ;   /*                                  */
PIN 10 =  STATE3   ;   /*                                  */
PIN 11 =  STATE4   ;   /*                                  */
PIN 13 =  STATE5   ;   /*                                  */
PIN 14 = !FIRST    ;   /*                                  */
PIN 23 =  HOTOB    ;   /*                                  */

/** Outputs **/

PIN 17 =  EGOENB   ;   /* feed pin to control tristate     */
PIN 18 =  EGO4     ;   /*                                  */
PIN 19 =  EGO3     ;   /*                                  */
PIN 20 =  EGO2     ;   /*                                  */
PIN 21 =  EGO1     ;   /*                                  */
PIN 22 =  EGO0     ;   /*                                  */
PIN 15 =   ATE     ;
```

```
/** Declarations and Intermediate-Variable Definitions **/

ECDATVAL = EARDY & VMROP ;

$INCLUDE STATE.DEF

/******************************************************************/

/** Logic Equations **/

EGOENB   = ( $P1 # $P2 # $P3 # $P6
           # $Q1 # $Q2 # $Q3
           # $S1 # $S2 # $S3 # $S7 # $S8
           # $H0 # $H1 # $VW # $VP # $V1
           # $U0 # $M0 # $M2 # $M3
           ) & ATE
           ;

[EGO4..0].OE    = EGOENB ;

APPEND EGO0  = 'H'0 ;

APPEND EGO1  = 'H'0 ;

APPEND EGO2  = HOT0A &    ( $H0 # $H1 # $V1
                          # $P1 # $P2 # $P3 # $P6
                          # $Q1 # $Q2 # $Q3
                          # $S1 # $S2 # $S3 # $S7 # $S8
                          # $U0 # $M0 # $M2 # $M3
                          )
                          ;

APPEND EGO3  = HOT0B  &   ( $H0 # $H1 # $V1 )
             # SIZEOK &   ( $P1 # $P2 # $P3 # $P6
                          # $Q1 # $Q2 # $Q3
                          # $S1 # $S2 # $S3 # $S7 # $S8
                          # $M2
                          )
             # EARDY  &   ( $U0 # $M0 # $VW )
             # FIRST  &   ( $M3 )
             ;

APPEND EGO4  = ECDATVAL & ( $P1 # $P2 # $P3 # $P6
                          # $Q1 # $Q2 # $Q3
                          # $S1 # $S2 # $S3 # $S7 # $S8
                          # $M2
                          )
             # FEMPTY  &  ( $U0 # $M0 # $M3 # $VW )
             ;

ATE = 'B'1 ;
```

V. IGO Signals

```
                         -----------------
                      01 |               |
    VMBUS-00+00    --->  |    22V10      |
                      02 |               | 23
    VMBUS-01+00    --->  |               | <--> IGOENB+NC
                      03 |               | 22
    VMBUS-02+00    --->  |               | ---> IGO0+00 --> HTRN0+00
                      04 |               | 21
    PTR-19+00      --->  |               | ---> IGO1+00 --> HTRN1+00
                      05 |               | 20
    IADRS19Q+00    --->  |               | ---> IGO2+00 --> HTRN2+00
                      06 |               | 19
    PDMISS+00      --->  |               | ---> IGO3+00 --> HTRN3+00
                      07 |               | 18
    STATE0+00      --->  |               | ---> IGO4+00 --> HTRN4+00
                      08 |               | 17
    STATE1+00      --->  |               | <--> ATE22-NC
                      09 |               | 16
    STATE2+00      --->  |               | <--- ICLASS+00
                      10 |               | 15
    STATE3+00      --->  |               | <--- CVPVLD+00
                      11 |               | 14
    STATE4+00      --->  |               | <--- WRITE+00
                      13 |               |
    STATE5+00      --->  |               |
                         -----------------
```

D22

```
/**   Inputs   **/

PIN  1 = VMBUS0     ;   /*                                          */
PIN  2 = VMBUS1     ;   /*                                          */
PIN  3 = VMBUS2     ;   /*                                          */
PIN  4 = PTR19      ;   /*                                          */
PIN  5 = IADRS19Q   ;   /*                                          */
PIN  6 = PDMISS     ;   /*                                          */
PIN  7 = STATE0     ;   /*                                          */
PIN  8 = STATE1     ;   /*                                          */
PIN  9 = STATE2     ;   /*                                          */
PIN 10 = STATE3     ;   /*                                          */
PIN 11 = STATE4     ;   /*                                          */
PIN 13 = STATE5     ;   /*                                          */
PIN 14 = WRITE      ;   /*                                          */
PIN 15 = CVPVLD     ;   /*                                          */
PIN 16 = ICLASS     ;   /*                                          */

/**   Outputs   **/

PIN 17 = ATE        ;   /*                                          */
PIN 18 = IGO4       ;   /*                                          */
PIN 19 = IGO3       ;   /*                                          */
PIN 20 = IGO2       ;   /*                                          */
PIN 21 = IGO1       ;   /*                                          */
PIN 22 = IGO0       ;   /*                                          */
PIN 23 = IGOENB     ;   /* feed pin to control tristate             */
```

```
/** Declarations and Intermediate-Variable Definitions **/

$INCLUDE STATE.DEF

/****************************************************************/

/**  Logic Equations  **/

IGOENB   = ( $I0
           # $A1 # $V0
           # $K0 # $K1 # $K2 # $K3
           # $P0 # $P4 # $Q4 # $S4
           ) & ATE
           ;

[IGO4..0].OE = IGOENB ;

APPEND IGO0 = 'H'0 ;

APPEND IGO1 = 'H'0 ;

APPEND IGO2 = $I0 & PDMISS & !CVPVLD
            # ( $A1 # $V0 ) & VMBUS0
            # ( $P0 # $P4 # $Q4 # $S4 ) & VMBUS0
            ;

APPEND IGO3 = $I0 & ( PTR19 $ IADRS19Q )
            # ( $A1 # $V0 ) & CVPVLD
            # ( $P0 # $P4 ) & WRITE & ( !VMBUS1 # !VMBUS2 )
            ;

APPEND IGO4 = $I0 & ICLASS                       /* still 2C? */
            # $A1 & ICLASS                       /* indirect? */
            # $V0 & ICLASS                       /* validate? */
            # $K0 & ICLASS                       /* CTL = 0B? */
            # $K1 & ICLASS                       /* CTL = 1B? */
            # ( $K3 # $Q4 # $S4 ) & ICLASS       /* CTL = EA? */
            # ( $P0 # $P4 ) & VMBUS1 & ( !WRITE #  VMBUS2 )
            ;

ATE = 'B'1 ;
```

VI. GOTO Signals

```
                              -----------------
                        21   |                 |  17
          HTRN2+00     --->  |     7C291A      |  ---> A0ETAL-00
                        22   |                 |  16
          HTRN3+00     --->  |                 |  ---> STATEBAD+00
                        23   |                 |  15
          HTRN4+00     --->  |                 |  ---> GOTO05+00
                        01   |                 |  14
          STATE0+00    --->  |                 |  ---> GOTO04+00
                        02   |                 |  13
          STATE1+00    --->  |                 |  ---> GOTO03+00
                        03   |                 |  11
          STATE2+00    --->  |                 |  ---> GOTO02+00
                        04   |                 |  10
          STATE3+00    --->  |                 |  ---> GOTO01+00
                        05   |                 |  09
          STATE4+00    --->  |                 |  ---> GOTO00+00
                        06   |                 |  18
          STATE5+00    --->  |             CS+ |  <--- LOGIC1+00
                        07   |                 |  19
          HTRN0+00     --->  |             CS+ |  <--- LOGIC1+00
                        08   |                 |  20
          HTRN1+00     --->  |             CS- |  <--- ZGND
                              -----------------
```

D23

| State(s) | HTRN0 | HTRN1 | HTRN2 | HTRN3 | HTRN4 | GO-enb |
|---|---|---|---|---|---|---|
| A1, V0 | 0 | 0 | VMBUS0 | CVPVLD | ICLASS | IGOENB |
| I0 | 0 | 0 | PDMISS & !CVPVLD | BIT19NG | ICLASS | IGOENB |
| K0, K1, Q4, S4 | 0 | 0 | VMBUS0 | 0 | ICLASS | IGOENB |
| P0, P4 | 0 | 0 | VMBUS0 | PGMOD | PAGEOK | IGOENB |
| H0, H1, V1 | 0 | 0 | HOT0A | HOT0B | 0 | EGOENB |
| M3 | 0 | 0 | HOT0A | FIRST | FEMPTY | EGOENB |
| U0, M0, VW | 0 | 0 | HOT0A | EARDY | FEMPTY | EGOENB |
| M2, P1-3 P6, Q1-3, S1-3, S7-8 | 0 | 0 | HOT0A | SIZEOK | ECDATVAL | EGOENB |
| L0 | 0 | 0 | CTL1 | CTL2 | CTL3 | AGOENB |
| P9 | 0 | x | x | CLASS=2 | x | AGOENB |
| A0, AQ, AS, AP, X1, I3 | 0 | 8 | 4 | 2 | 1 | AGOENB |

```
coded for:  7 = QMISS = SPLAT & !DSPTHIT
            6 = SMISS = SPLAT & noa & !SEGHIT
            5 = FAULT = SPLAT & noa & ALARM
            4 = PMISS = SPLAT & noa & !PDHIT
            3 = IHLP1 = SPLAT & noa & CLASS:5
            B = IHLP3 = SPLAT & noa & CLASS:7
            2 = WMISS = SPLAT & noa & WRITE & !MODOK
            1 = PAGEX = SPLAT & noa & CLASS:[6..7] & CN12
            0 = A_OK  = SPLAT & noa & CLASS:4
            8 = B_OK  = SPLAT & noa & CLASS:[6..7]
            A = GO_L0 = CLASS:2
            C = GO_I0 = CLASS:3 where SPLAT = CLASS:[4..7]
         # CLASS:3 & !STATEAX
```

NOTE: Don't-care states are scattered as follows:
```
        in IGO    K2
        in AGO    C0, C5, H2, H3, H5, I2, I4, I5,
                  K4, K5, K6, K7, M1, P6, P8, Q0,
                  S0, S5, S6, S9, V2, X0, X2
```

/ Inputs /

```
PIN  1 = STATE0   ;   /* Where                         */
PIN  2 = STATE1   ;   /*                               */
PIN  3 = STATE2   ;   /*       are                     */
PIN  4 = STATE3   ;   /*             we                */
PIN  5 = STATE4   ;   /*                               */
PIN  6 = STATE5   ;   /*                    now ?      */
PIN  7 = HTRN0    ;   /* What                          */
PIN  8 = HTRN1    ;   /*       is                      */
PIN 21 = HTRN2    ;   /*          happening            */
PIN 22 = HTRN3    ;   /*                    out        */
PIN 23 = HTRN4    ;   /*                       there ? */
```

```
/** Outputs **/

PIN  9 = GOTO0      ;   /* So                                 */
PIN 10 = GOTO1      ;   /*    where                           */
PIN 11 = GOTO2      ;   /*         shall                      */
PIN 13 = GOTO3      ;   /*              we                    */
PIN 14 = GOTO4      ;   /*                 go                 */
PIN 15 = GOTO5      ;   /*                    next ?          */
PIN 16 = STATEBAD   ;   /* Is this combo legitimate ?         */
PIN 17 = !A0ETAL    ;   /* Will next state test "hits" ?      */

/******************************************************************/

/** Declarations and Intermediate-Variable Definitions **/

$INCLUDE    HEX.DEF

D23
TRUTH_TABLE     STATE,HTRN => G

: 2  ** address fields **
: 6  ** STATE = [STATE0,STATE1,STATE2,STATE3,STATE4,STATE5] **
: 5  ** HTRN  = [HTRN0,HTRN1,HTRN2,HTRN3,HTRN4] **
     ** G     = [!A0ETAL,STATEBAD,GOTO5,GOTO4,GOTO3,GOTO2,GOTO1,GOTO0] ;

: 0,0/800  = 40  ; ** background (STATEBAD) **

: %A0, 7   = %Q0 ; ** QMISS **
: %A0, 6   = %S0 ; ** SMISS **
: %A0, 5   = %V0 ; ** FAULT **
: %A0, 4   = %P0 ; ** PMISS **
: %A0, 3   = %H0 ; ** IHLP1 **
: %A0, 2   = %M0 ; ** WMISS **
: %A0, 1   = %X0 ; ** PAGEX **
: %A0, 0   = %A0 ; ** A_OK **
: %A0, 8   = %A1 ; ** B_OK **
: %A0, A   = %L0 ; ** GO_L0 **
: %A0, C   = %I0 ; ** GO_I0 **
: %A0, E   = %K5 ; ** CTLBAD (2 of 3) **

: %AQ, 7   = %Q0 ; ** QMISS **
: %AQ, 6   = %S0 ; ** SMISS **
: %AQ, 5   = %V0 ; ** FAULT **
: %AQ, 4   = %P0 ; ** PMISS **
: %AQ, 3   = %H0 ; ** IHLP1 **
: %AQ, 2   = %M0 ; ** WMISS **
: %AQ, 1   = %X0 ; ** PAGEX **
: %AQ, 0   = %A0 ; ** A_OK **
: %AQ, 8   = %A1 ; ** B_OK **
: %AQ, A   = %L0 ; ** GO_L0 **
: %AQ, C   = %I0 ; ** GO_I0 **
: %AQ, E   = %K5 ; ** CTLBAD (2 of 3) **

: %AS, 7   = %Q0 ; ** QMISS **
: %AS, 6   = %S0 ; ** SMISS **
: %AS, 5   = %V0 ; ** FAULT **
: %AS, 4   = %P0 ; ** PMISS **
: %AS, 3   = %H0 ; ** IHLP1 **
: %AS, 2   = %M0 ; ** WMISS **
: %AS, 1   = %X0 ; ** PAGEX **
: %AS, 0   = %A0 ; ** A_OK **
: %AS, 8   = %A1 ; ** B_OK **
: %AS, A   = %L0 ; ** GO_L0 **
: %AS, C   = %I0 ; ** GO_I0 **
```

```
: %AP, 7    = %Q0 ; ** QMISS **
: %AP, 6    = %S0 ; ** SMISS **
: %AP, 5    = %V0 ; ** FAULT **
: %AP, 4    = %P0 ; ** PMISS **
: %AP, 3    = %H0 ; ** IHLP1 **
: %AP, 2    = %M0 ; ** WMISS **
: %AP, 1    = %X0 ; ** PAGEX **
: %AP, 0    = %A0 ; ** A_OK **
: %AP, 8    = %A1 ; ** B_OK **
: %AP, A    = %L0 ; ** GO_L0 **
: %AP, C    = %I0 ; ** GO_I0 **

: %A1, 5    = %H1 ; ** ICLASS **
: %A1, 1    = %H1 ; ** ICLASS **
: %A1, 4    = %A0 ; ** !ICLASS & !CVP **
: %A1, 0    = %A0 ; ** !ICLASS & !CVP **
: %A1, 6    = %C0 ; ** CVP & VMBUS0 **
: %A1, 2    = %C5 ; ** CVP & !VMBUS0 **

: %C0, 0/20 = %K2 ; **    **

: %C5, 0/20 = %K2 ; **    **

: %H0, 0/4  = %H0 ; ** !HOT0A **
: %H0, 4/4  = %H2 ; ** HOT0A **

: %H1, 0/4  = %H1 ; ** !HOT0A **
: %H1, 4/4  = %H3 ; ** HOT0A **

: %H2, 0/20 = %A0 ; **    **

: %H3, 0/20 = %H5 ; **    **

: %H5, 0/20 = %A0 ; **    **

: %I0, 7    = %I2 ; ** ICLASS & !CVPVLD & PDMISS & BIT19NG ** (real 2C)
: %I0, 5    = %I3 ; ** ICLASS & !CVPVLD & PDMISS & !BIT19NG ** (real 2C)
: %I0, 3    = %A0 ; ** ICLASS & (!PDMISS or CVPVLD) ** (false 2C, exit)
: %I0, 1    = %A0 ; ** ICLASS & (!PDMISS or CVPVLD) ** (false 2C, exit)
: %I0, 6    = %AQ ; ** !ICLASS ** (false 2C, real work to do)
: %I0, 4    = %AQ ; ** !ICLASS ** (false 2C, real work to do)
: %I0, 2    = %AQ ; ** !ICLASS ** (false 2C, real work to do)
: %I0, 0    = %AQ ; ** !ICLASS ** (false 2C, real work to do)

: %I2, 0/20 = %I3 ; **    **

: %I3, 7    = %Q0 ; ** QMISS **
: %I3, 6    = %S0 ; ** SMISS **
: %I3, 5    = %V0 ; ** FAULT **
: %I3, 4    = %P0 ; ** PMISS **
: %I3, 0/4  = %I4 ; ** !QMISS & !SMISS & !FAULT & !PMISS **
: %I4, 0/20 = %I5 ; **    **

: %I5, 0/20 = %A0 ; **    **

: %K0, 1    = %V2 ; ** ICLASS (CTL = 0B) **
: %K0, 3    = %V2 ; ** ICLASS (CTL = 0B) **
: %K0, 5    = %V2 ; ** ICLASS (CTL = 0B) **
: %K0, 7    = %V2 ; ** ICLASS (CTL = 0B) **
: %K0, 0    = %A0 ; ** !ICLASS **
: %K0, 2    = %A0 ; ** !ICLASS **
: %K0, 4    = %A0 ; ** !ICLASS **
: %K0, 6    = %A0 ; ** !ICLASS **

: %K1, 1    = %V2 ; ** ICLASS (CTL = 1B) **
: %K1, 3    = %V2 ; ** ICLASS (CTL = 1B) **
: %K1, 5    = %V2 ; ** ICLASS (CTL = 1B) **
: %K1, 7    = %V2 ; ** ICLASS (CTL = 1B) **
: %K1, 0    = %A0 ; ** !ICLASS **
```

```
: %K1, 2     = %A0 ; ** !ICLASS **
: %K1, 4     = %A0 ; ** !ICLASS **
: %K1, 6     = %A0 ; ** !ICLASS **

: %K2, 0/20  = %A0 ; **         **

: %K3, 0/20  = %A0 ; **         **

: %K4, 0/20  = %A0 ; **         **

: %K5, 0/20  = %A0 ; **         **

: %K6, 0/20  = %S4 ; ** CTL:EA **

: %K7, 0/20  = %V0 ; **         **

: %L0, 0     = %K0 ; ** CTL:0X **
: %L0, 1     = %K1 ; ** CTL:1X **
: %L0, 2     = %K2 ; ** CTL:2X **
: %L0, 3     = %K3 ; ** CTL:3X **
: %L0, 4     = %K4 ; ** CTL:4X **
: %L0, 6     = %K6 ; ** CTL:6X **
: %L0, 7     = %K7 ; ** CTL:7X **
: %L0, A     = %K5 ; ** CTLBAD (class=2+) **
: %M0, 0     = %M0 ; ** !FEMPTY & !HOT0A **
: %M0, 1     = %M0 ; ** !EARDY  & !HOT0A **
: %M0, 2     = %M0 ; ** !FEMPTY & !HOT0A **
: %M0, 3     = %M1 ; ** FEMPTY & EARDY **
: %M0, 4/4   = %M1 ; ** HOT0A **

: %M1, 0/20  = %M2 ; **         **

: %M2, 0     = %M2 ; ** !ECDATVAL & !HOT0A **
: %M2, 2     = %M2 ; ** !ECDATVAL & !HOT0A **
: %M2, 1     = %M3 ; ** ECDATVAL **
: %M2, 3     = %M3 ; ** ECDATVAL **
: %M2, 4/4   = %M3 ; ** HOT0A **

: %M3, 0/2   = %M3 ; ** !FIRST & !HOT0A **
: %M3, 2/6   = %P0 ; ** FIRST # HOT0A **

: %P0, 4/4   = %P1 ; ** VMBUS0   Paged **
: %P0, 0/4   = %P6 ; ** !VMBUS0  Unpaged **

: %P1, 0/2   = %V0 ; ** !SIZEOK **
: %P1, 4/2   = %V0 ; ** !SIZEOK **
: %P1, 2/2   = %P2 ; ** SIZEOK **
: %P1, 6/2   = %P2 ; ** SIZEOK **

: %P2, 0/20  = %P3 ; **         **

: %P3, 0     = %P3 ; ** !ECDATVAL & !HOT0A **
: %P3, 2     = %P3 ; ** !ECDATVAL & !HOT0A **
: %P3, 1     = %M3 ; ** ECDATVAL **
: %P3, 3     = %P4 ; ** ECDATVAL **
: %P3, 4/4   = %P4 ; ** HOT0A **

: %P4, 6     = %M0 ; ** VMBUS0 & PGMOD **
: %P4, 5     = %AP ; ** VMBUS0 & PAGEOK **
: %P4, 4     = %U0 ; ** VMBUS0 & !PGMOD & !PAGEOK **
: %P4, 0/4   = %V0 ; ** !VMBUS0 **

: %P6, 0/2   = %V0 ; ** !SIZEOK **
: %P6, 4/2   = %V0 ; ** !SIZEOK **
: %P6, 2/2   = %P8 ; ** SIZEOK **
: %P6, 6/2   = %P8 ; ** SIZEOK **

: %P8, 0/20  = %P9 ; **         **
```

```
: %P9, 2   = %A0 ; ** CLASS = 2 **
: %P9, A   = %A0 ; ** CLASS = 2 **
: %P9, 0/2 = %AP ; ** !(CLASS = 2) **
: %P9, 3/7 = %AP ; ** !(CLASS = 2) **
: %P9, B/5 = %AP ; ** !(CLASS = 2) **

: %Q0, 0/20 = %Q1 ; **    **

: %Q1, 0/2 = %V0 ; ** !SIZEOK **
: %Q1, 4/2 = %V0 ; ** !SIZEOK **
: %Q1, 2/2 = %Q2 ; ** SIZEOK **
: %Q1, 6/2 = %Q2 ; ** SIZEOK **

: %Q2, 0/20 = %Q3 ; **    **

: %Q3, 0   = %Q3 ; ** !ECDATVAL & !HOT0A **
: %Q3, 2   = %Q3 ; ** !ECDATVAL & !HOT0A **
: %Q3, 1   = %Q4 ; ** ECDATVAL **
: %Q3, 3   = %Q4 ; ** ECDATVAL **
: %Q3, 4/4 = %Q4 ; ** HOT0A **

: %Q4, 0/4 = %V0 ; ** !VMBUS0 **
: %Q4, 4/4 = %AQ ; ** VMBUS0 **

: %S0, 0/20 = %S1 ; **    **

: %S1, 0/2 = %V0 ; ** !SIZEOK **
: %S1, 4/2 = %V0 ; ** !SIZEOK **
: %S1, 2/2 = %S2 ; ** SIZEOK **
: %S1, 6/2 = %S2 ; ** SIZEOK **

: %S2, 0/20 = %S3 ; **    **

: %S3, 0   = %S3 ; ** !ECDATVAL & !HOT0A **
: %S3, 2   = %S3 ; ** !ECDATVAL & !HOT0A **
: %S3, 1   = %S4 ; ** ECDATVAL **
: %S3, 3   = %S4 ; ** ECDATVAL **
: %S3, 4/4 = %S4 ; ** HOT0A **

: %S4, 0   = %V0 ; ** !VMBUS0 & !ICLASS **
: %S4, 1   = %K5 ; ** !VMBUS0 & ICLASS (CTL = EA) **
: %S4, 4   = %S5 ; ** VMBUS0 & !ICLASS **
: %S4, 5   = %P9 ; ** VMBUS0 & ICLASS (CTL = EA) **

: %S5, 0/20 = %S6 ; **    **

: %S6, 0/20 = %S7 ; **    **

: %S7, 0/20 = %S8 ; **    **

: %S8, 0   = %S8 ; ** !ECDATVAL & !HOT0A **
: %S8, 2   = %S8 ; ** !ECDATVAL & !HOT0A **
: %S8, 1   = %S9 ; ** ECDATVAL **
: %S8, 3   = %S9 ; ** ECDATVAL **
: %S8, 4/4 = %S9 ; ** HOT0A **

: %S9, 0/20 = %AS ; **    **

: %U0, 0   = %U0 ; ** !FEMPTY & !HOT0A **
: %U0, 1   = %U0 ; ** !EARDY  & !HOT0A **
: %U0, 2   = %U0 ; ** !FEMPTY & !HOT0A **
: %U0, 3   = %M1 ; ** FEMPTY & EARDY **
: %U0, 4/4 = %M1 ; ** HOT0A **

: %V0, 0/3 = %VW ; ** !VLD **
: %V0, 4/3 = %VW ; ** !VLD **
: %V0, 3   = %K1 ; ** VLD **
: %V0, 7   = %K1 ; ** VLD **
```

```
: %VW, 0/3  = %VW ; ** !EARDY # !FEMPTY **
: %VW, 3    = %VP ; ** EARDY & FEMPTY **

: %VP, 0/20 = %V1 ; **            **

: %V1, 0    = %V1 ; ** !HOT0A & !HOT0B **
: %V1, 2    = %V2 ; ** HOT0B **
: %V1, 4    = %A0 ; ** HOT0A **

: %V2, 0/20 = %A0 ; **            **

: %X0, 0/20 = %X1 ; **            **

: %X1, 7    = %Q0 ; ** QMISS **
: %X1, 6    = %S0 ; ** SMISS **
: %X1, 5    = %V0 ; ** FAULT **
: %X1, 4    = %P0 ; ** PMISS **
: %X1, B    = %H1 ; ** IHLP3 **
: %X1, 3    = %H1 ; ** IHLP3 & CLASS incremented **
: %X1, 2    = %M0 ; ** WMISS **
: %X1, 8    = %X2 ; ** B_OK & !IHLP3 **
: %X1, 0    = %X2 ; ** B_OK & !IHLP3 & CLASS incremented **
: %X1, 1    = %X2 ; ** B_OK & !IHLP3 & CLASS incremented **

: %X2, 0/20 = %A1 ; **            **
```

VII.

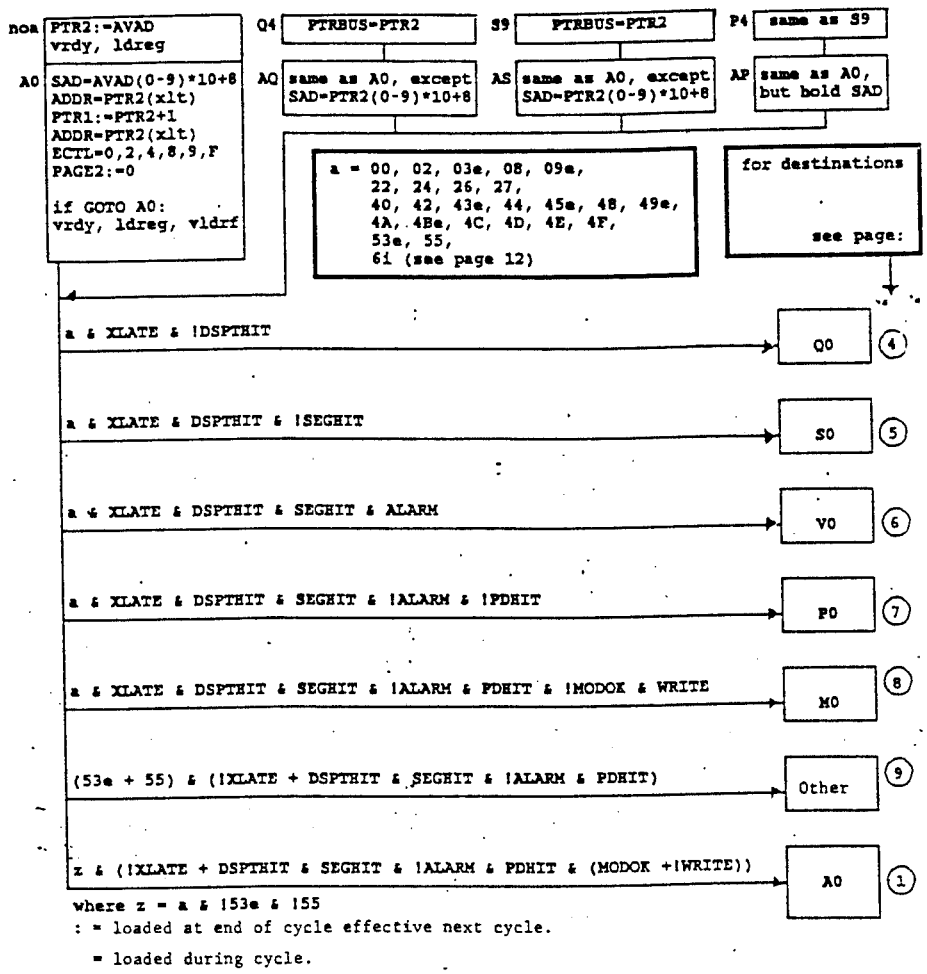

where z = a & !53e & !55
: = loaded at end of cycle effective next cycle.
- = loaded during cycle.

SINGLE-WORD OR ALIGNED DOUBLE-WORD READ/WRITES

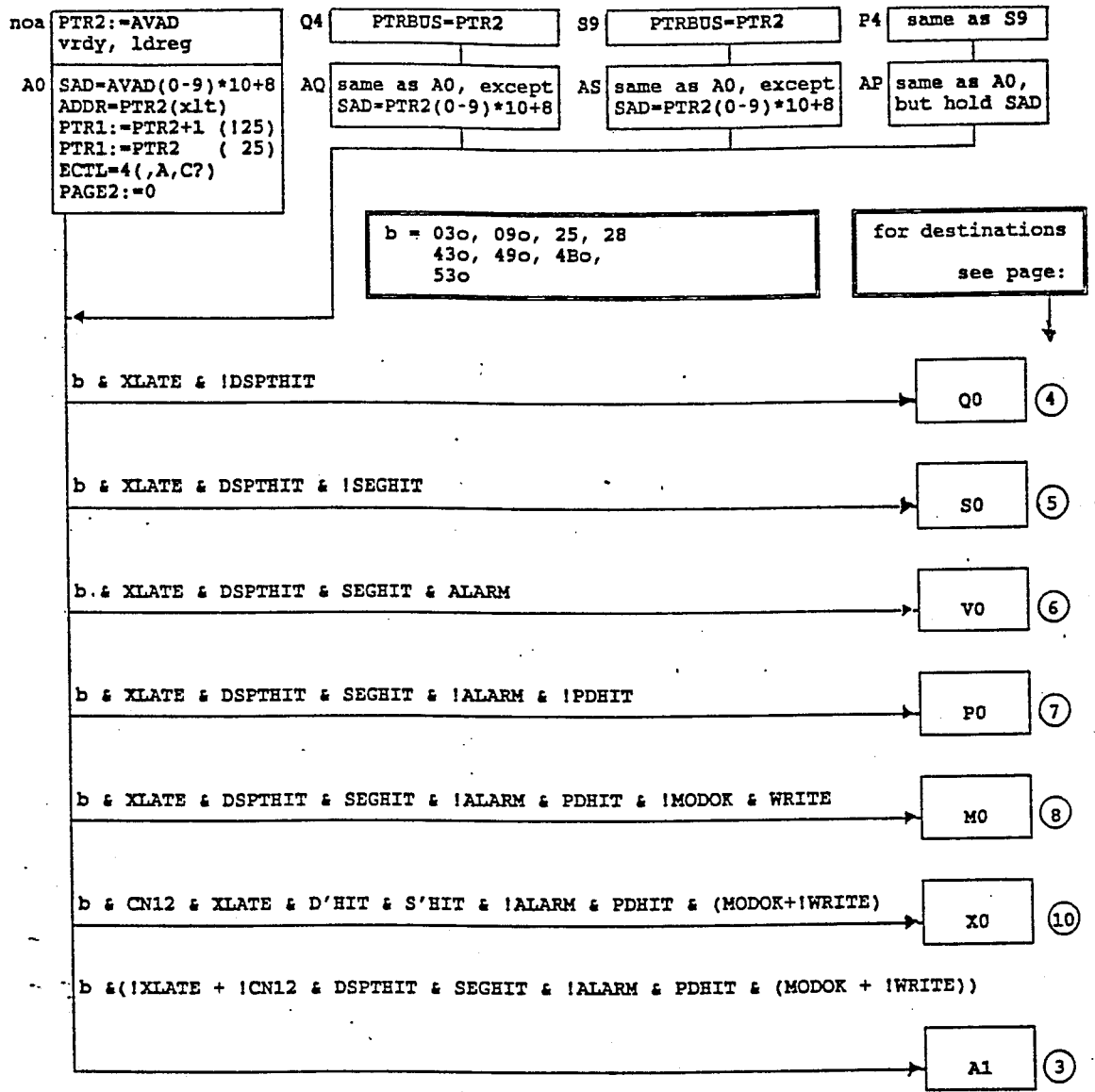
UNALIGNED DOUBLE-WORD READ/WRITES (PART 1)

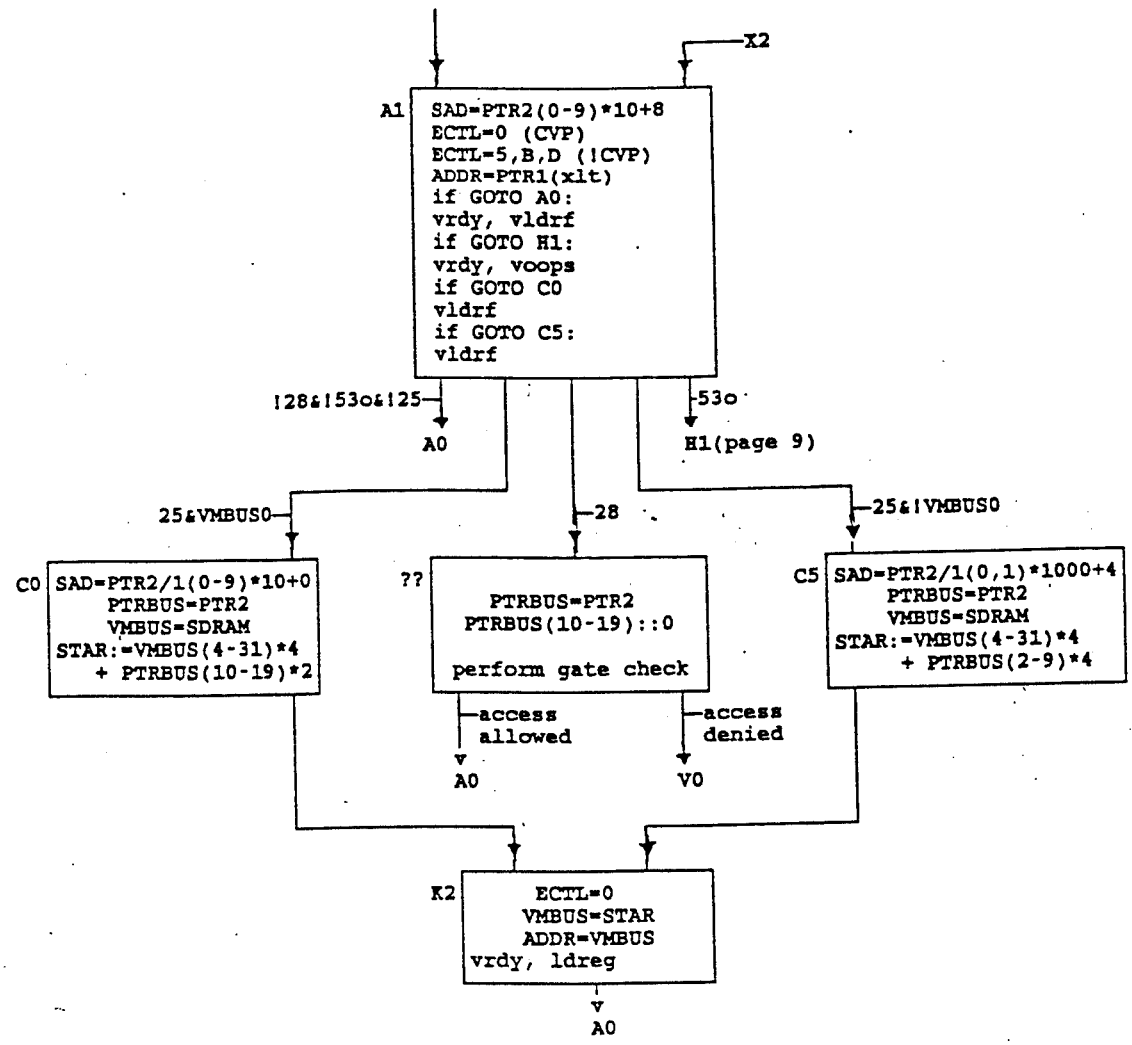
UNALIGNED DOUBLE-WORD READ/WRITES (PART 2)

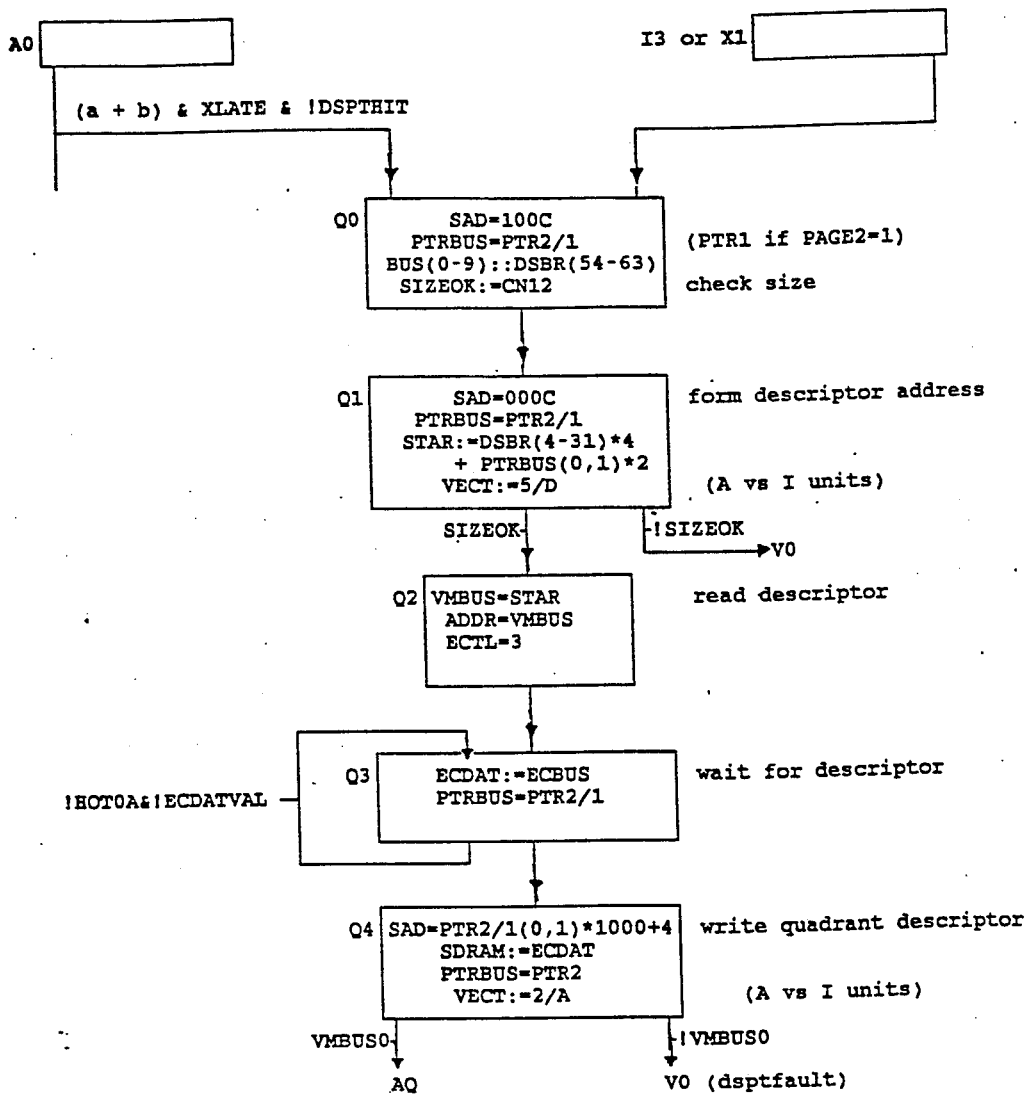
QUADRANT-DESCRIPTOR-MISS ROUTINE

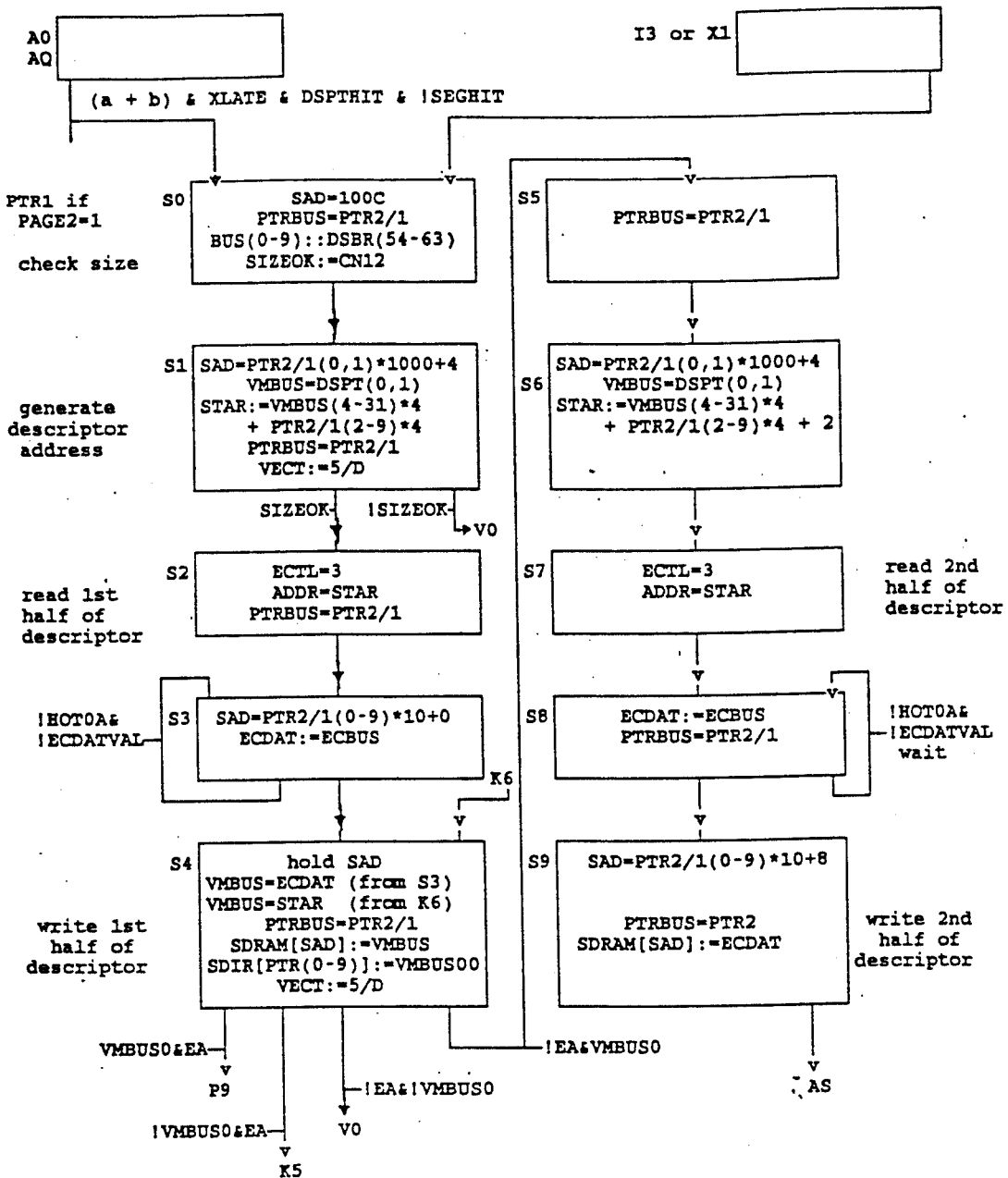
SEGMENT-DESCRIPTOR-MISS ROUTINE

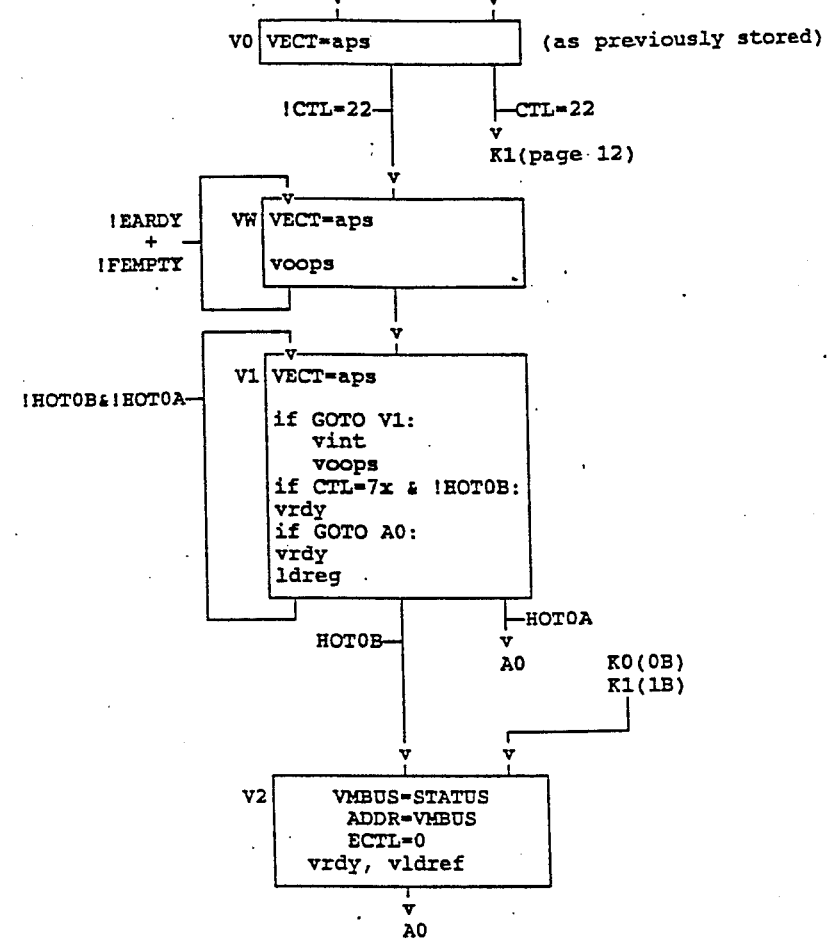
ACCESS-VIOLATION ROUTINE

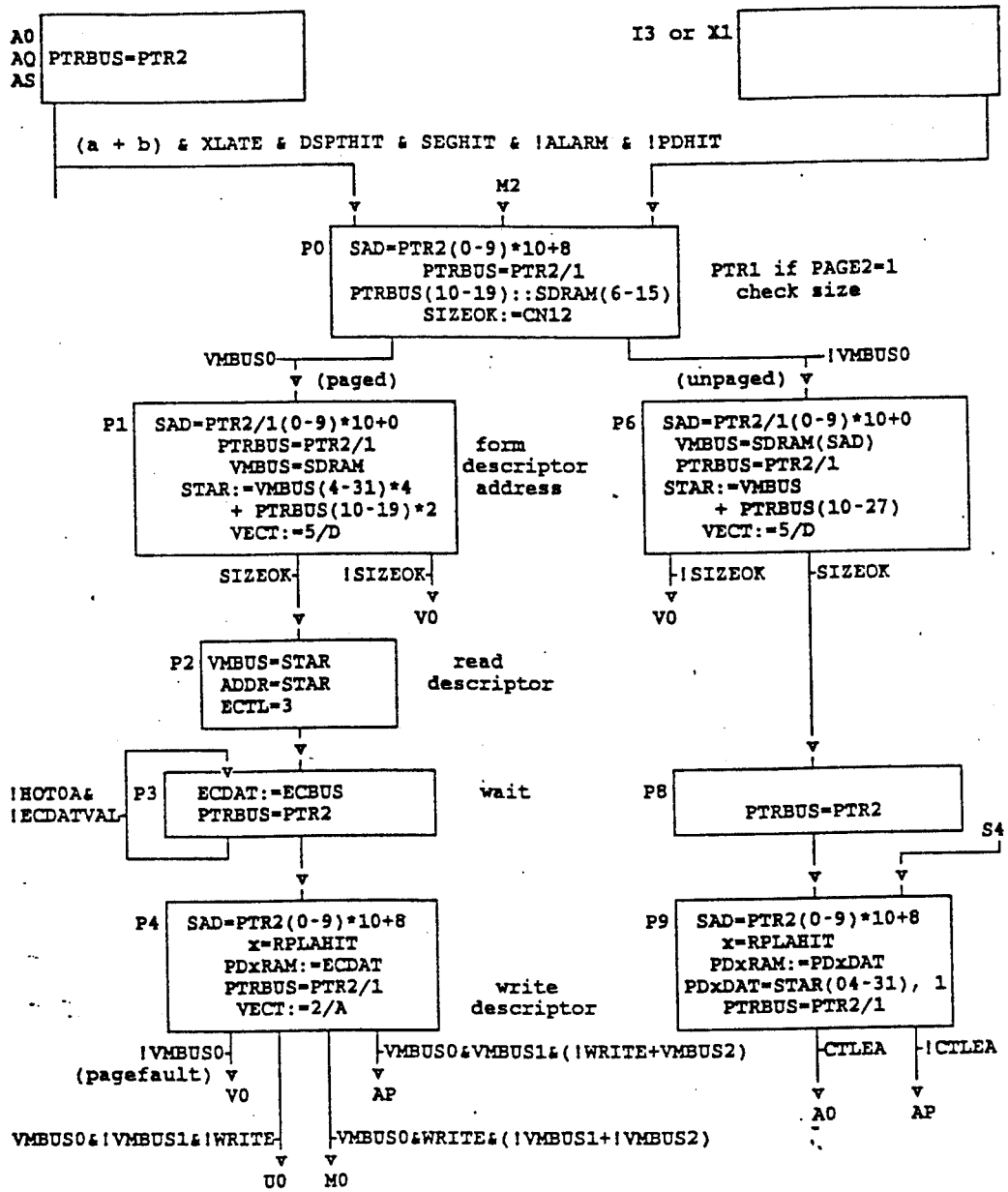
PAGE-DESCRIPTOR-MISS ROUTINE

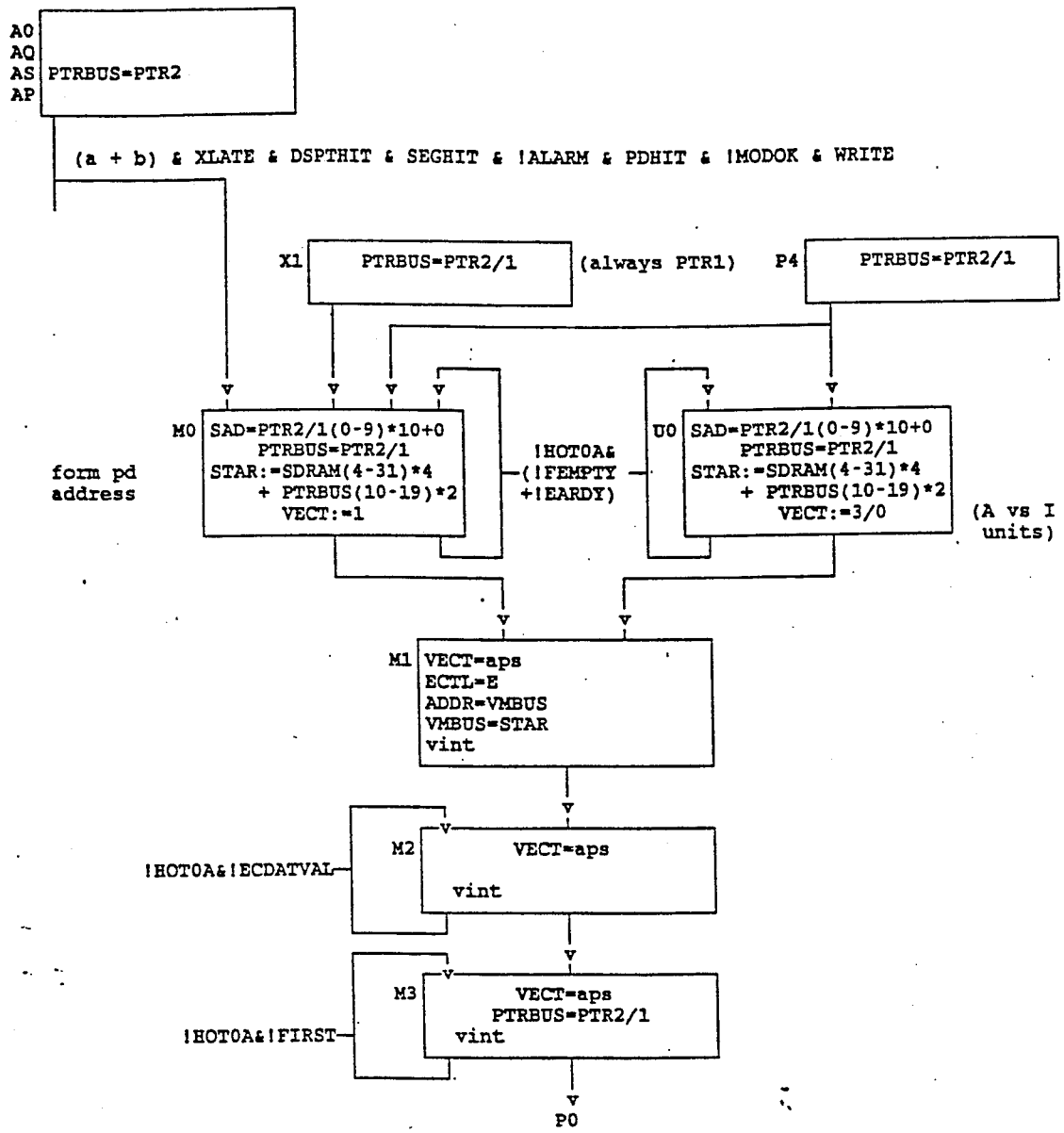
NOTE: Code 0B may not be used to acknowledge a "Used or Modified" (VECT=0 or 1) interrupt.
⑧
PROCESSING OF "USED" AND "MODIFIED" BITS

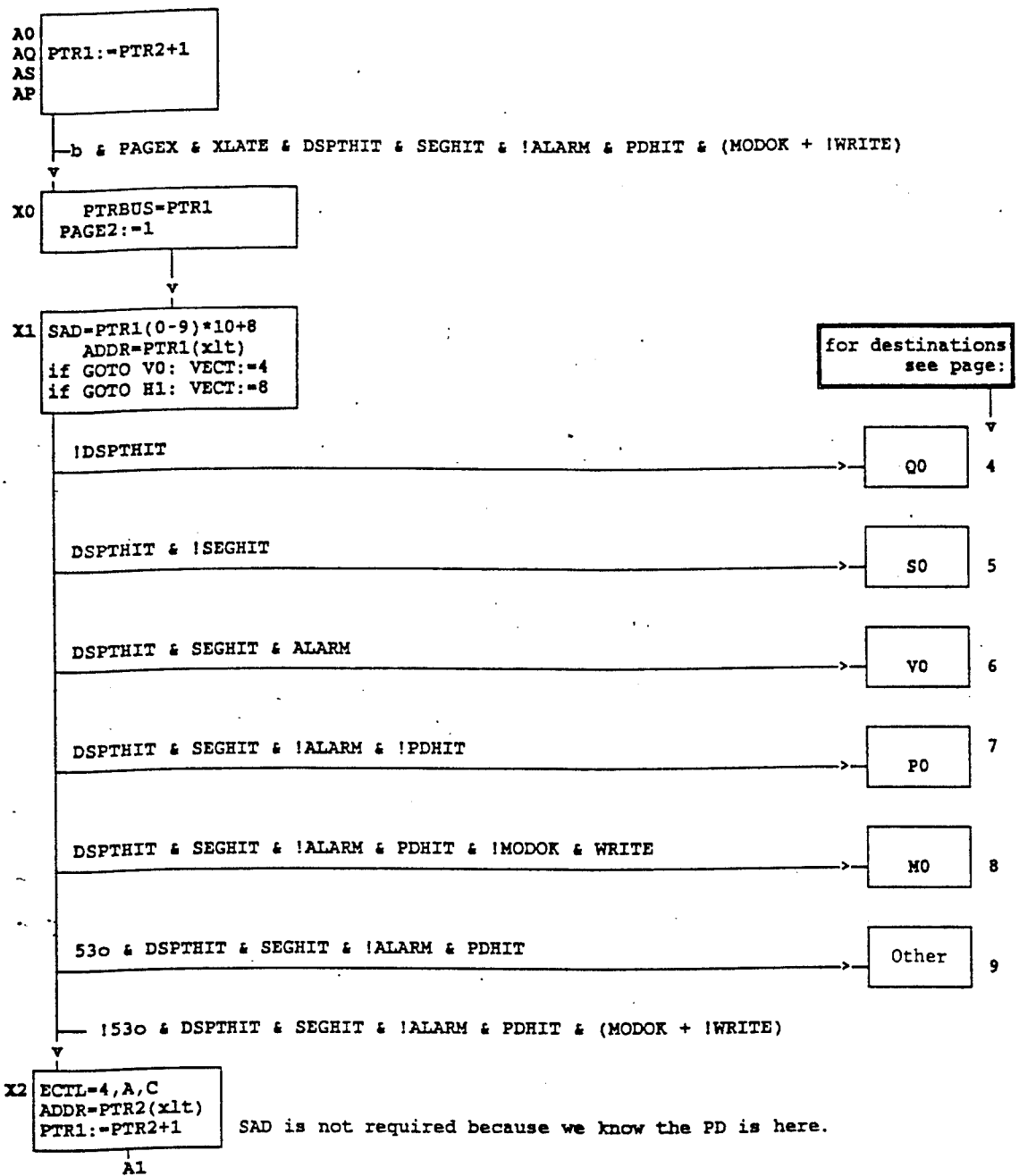
DOUBLE-WORD PAGE-CROSS ROUTINE

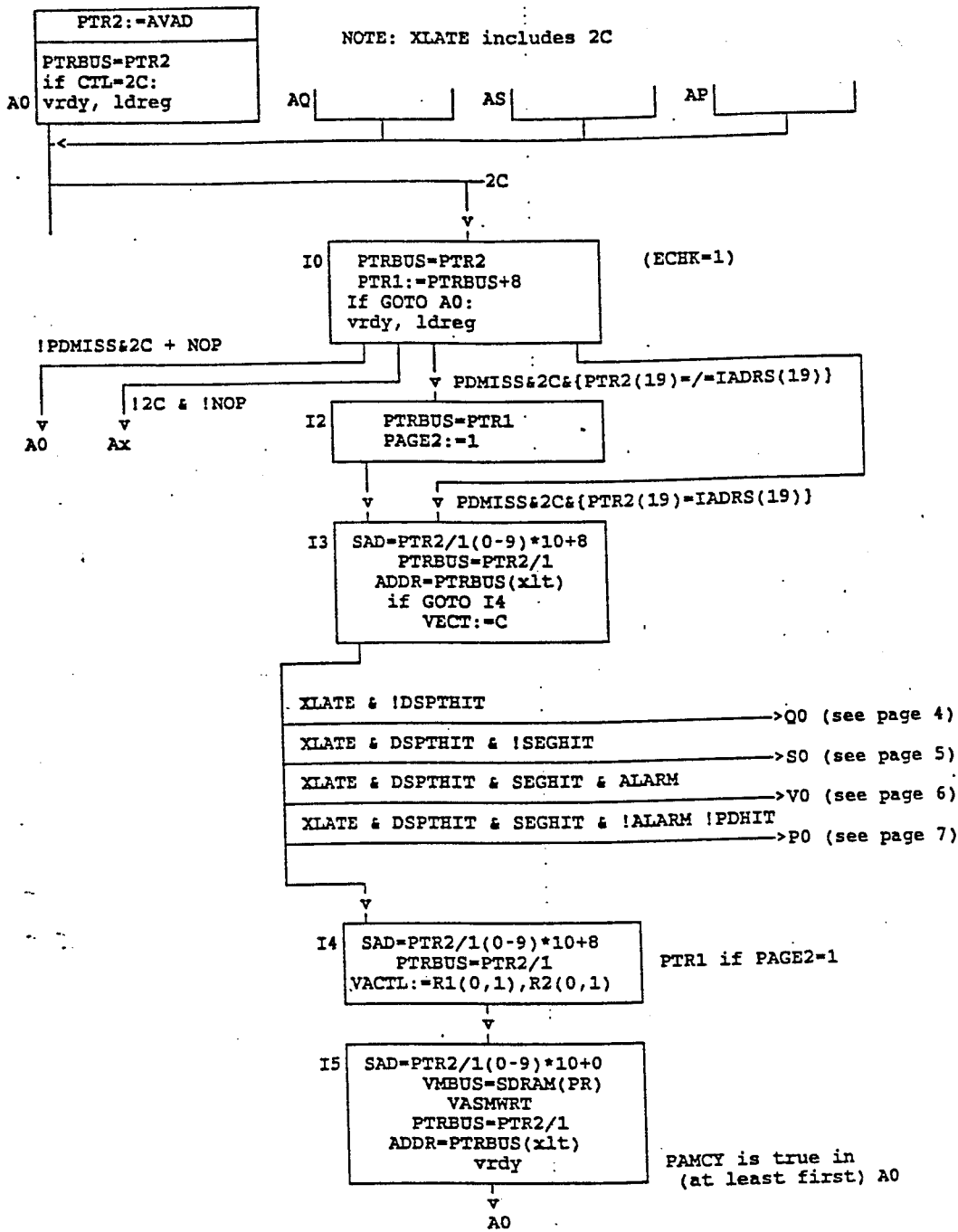
I-UNIT VIRTUAL CONVERSIONS

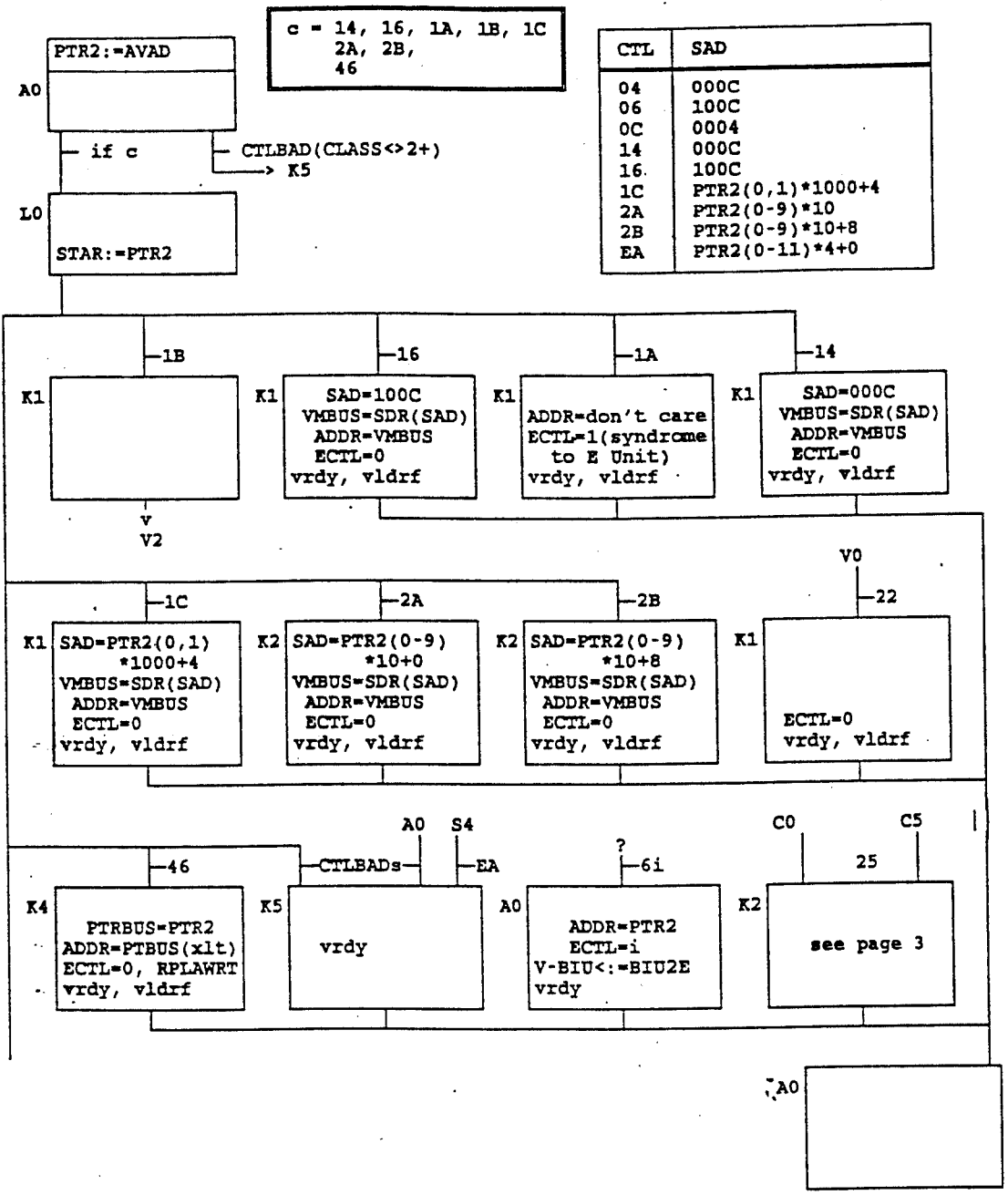
MISCELLANEOUS "LOCAL" REFERENCES (PART 1)

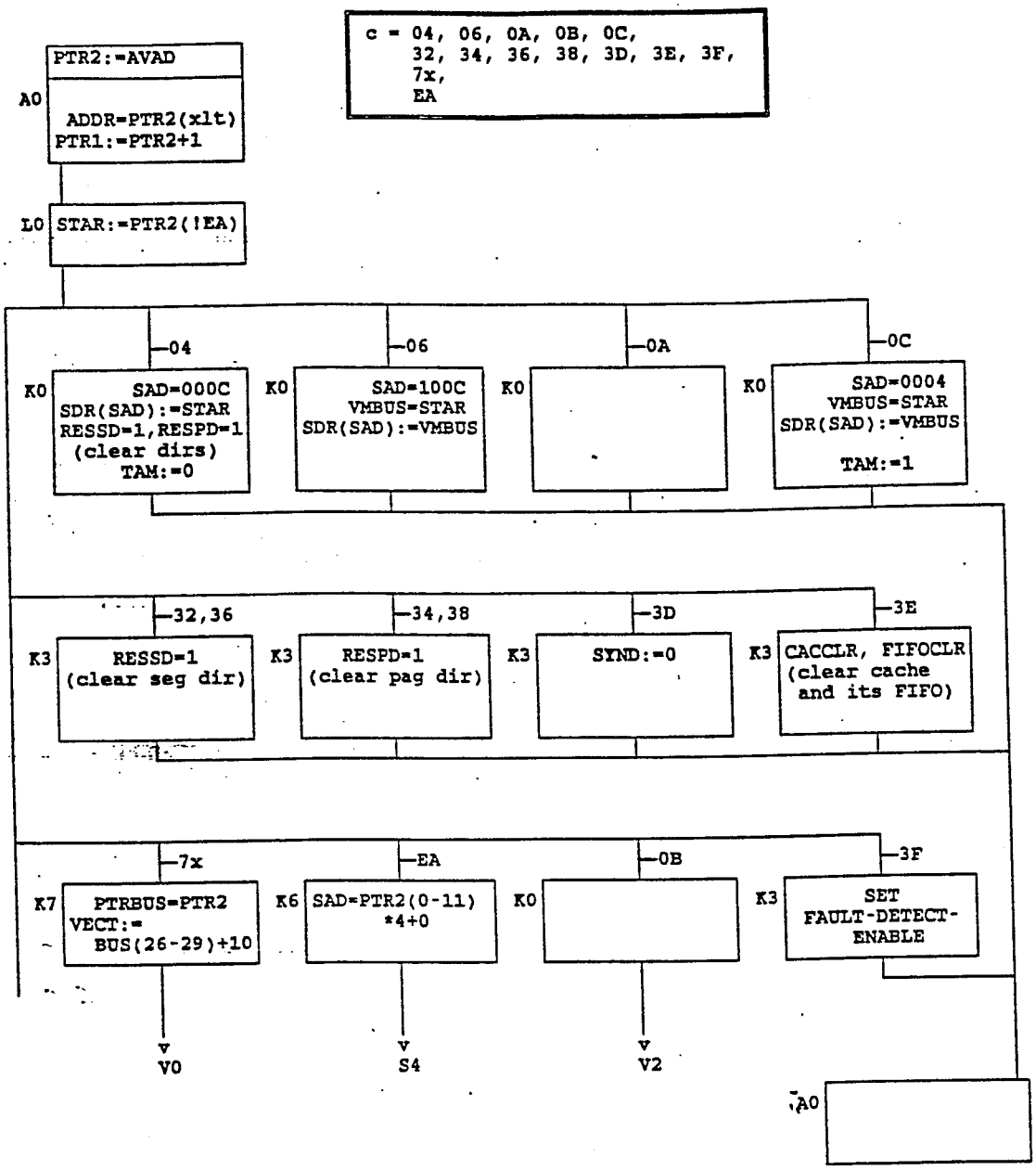
MISCELLANEOUS LOCAL REFERENCES (PART 2)

VIII. STATE.DEF

```
          0-      1-      2-      3-
        ------------------------------
   -0  |  A0      Q0      P0      S0  |
   -1  |  AQ+     Q1      P1      S1  |
   -2  |  X0      Q2      P2      S2  |
   -3  |  X1      Q3      P3      S3  |
   -4  |  X2      Q4      P4      S4  |
   -5  |  A1      U0      V0      M0  |
   -6  |  K0      K4      V1      M1  |
   -7  |  K1      K5      V2      M3  |
        ------------------------------
   -8  |  H0      I0      M2      S5  |
   -9  |  H1              P6      S6  |
   -A  |  H2      I2              S7  |
   -B  |  H3      I3      P8      S8  |
   -C  |          I4      P9      S9  |
   -D  |  H5      I5      C0      C5  |
   -E  |  K2      K6      VW      VP  |
   -F  |  K3      K7      L0          |
        ------------------------------

*****************************************************************/

Z5 = STATE0; Z4 = STATE1; Z3 = STATE2; Z2 = STATE3; Z1 = STATE4; Z0 = STATE5;
FIELD STATE   = [Z5..0];

/* STATE PAGE 2 */

$DEFINE    $A0     (STATE:00)
$DEFINE    $A1     (STATE:05)
$DEFINE    $AP     (STATE:01)
$DEFINE    $AQ     (STATE:01)
$DEFINE    $AS     (STATE:01)
$DEFINE    $C0     (STATE:2D)
$DEFINE    $C5     (STATE:3D)
$DEFINE    $H0     (STATE:08)
$DEFINE    $H1     (STATE:09)
$DEFINE    $H2     (STATE:0A)
$DEFINE    $H3     (STATE:0B)
$DEFINE    $H5     (STATE:0D)
$DEFINE    $I0     (STATE:18)
$DEFINE    $I2     (STATE:1A)
$DEFINE    $I3     (STATE:1B)
$DEFINE    $I4     (STATE:1C)
$DEFINE    $I5     (STATE:1D)
$DEFINE    $K0     (STATE:06)
$DEFINE    $K1     (STATE:07)
$DEFINE    $K2     (STATE:0E)
$DEFINE    $K3     (STATE:0F)
$DEFINE    $K4     (STATE:16)
$DEFINE    $K5     (STATE:17)
$DEFINE    $K6     (STATE:1E)
$DEFINE    $K7     (STATE:1F)
$DEFINE    $L0     (STATE:2F)
$DEFINE    $M0     (STATE:35)
$DEFINE    $M1     (STATE:36)
$DEFINE    $M2     (STATE:28)
$DEFINE    $M3     (STATE:37)
$DEFINE    $P0     (STATE:20)
$DEFINE    $P1     (STATE:21)
$DEFINE    $P2     (STATE:22)
$DEFINE    $P3     (STATE:23)
$DEFINE    $P4     (STATE:24)
$DEFINE    $P6     (STATE:29)
```

```
$DEFINE    $P8    (STATE:2B)
$DEFINE    $P9    (STATE:2C)
$DEFINE    $Q0    (STATE:10)
$DEFINE    $Q1    (STATE:11)
$DEFINE    $Q2    (STATE:12)
$DEFINE    $Q3    (STATE:13)
$DEFINE    $Q4    (STATE:14)
$DEFINE    $S0    (STATE:30)
$DEFINE    $S1    (STATE:31)
$DEFINE    $S2    (STATE:32)
$DEFINE    $S3    (STATE:33)
$DEFINE    $S4    (STATE:34)
$DEFINE    $S5    (STATE:38)
$DEFINE    $S6    (STATE:39)
$DEFINE    $S7    (STATE:3A)
$DEFINE    $S8    (STATE:3B)
$DEFINE    $S9    (STATE:3C)
$DEFINE    $U0    (STATE:15)
$DEFINE    $V0    (STATE:25)
$DEFINE    $VW    (STATE:2E)
$DEFINE    $VP    (STATE:3E)
$DEFINE    $V1    (STATE:26)
$DEFINE    $V2    (STATE:27)
$DEFINE    $X0    (STATE:02)
$DEFINE    $X1    (STATE:03)
$DEFINE    $X2    (STATE:04)

VIII. (Continued)  HEX.DEF
```

|     | 0-  | 1-  | 2-  | 3-  |
|-----|-----|-----|-----|-----|
| -0  | A0  | Q0  | P0  | S0  |
| -1  | AQ+ | Q1  | P1  | S1  |
| -2  | X0  | Q2  | P2  | S2  |
| -3  | X1  | Q3  | P3  | S3  |
| -4  | X2  | Q4  | P4  | S4  |
| -5  | A1  | U0  | V0  | M0  |
| -6  | K0  | K4  | V1  | M1  |
| -7  | K1  | K5  | V2  | M3  |
| -8  | H0  | I0  | M2  | S5  |
| -9  | H1  |     | P6  | S6  |
| -A  | H2  | I2  |     | S7  |
| -B  | H3  | I3  | P8  | S8  |
| -C  |     | I4  | P9  | S9  |
| -D  | H5  | I5  | C0  | C5  |
| -E  | K2  | K6  | VW  | VP  |
| -F  | K3  | K7  | L0  |     |

```
*********************************************************************/

/* HEX PAGE 2 */

$DEFINE    %A0    00
$DEFINE    %A1    85
$DEFINE    %AP    01
$DEFINE    %AQ    01
$DEFINE    %AS    01
$DEFINE    %C0    2D
$DEFINE    %C5    3D
$DEFINE    %H0    88
$DEFINE    %H1    89
$DEFINE    %H2    0A
$DEFINE    %H3    0B
$DEFINE    %H5    0D
```

| | | |
|---|---|---|
| $DEFINE | %I0 | 98 |
| $DEFINE | %I2 | 1A |
| $DEFINE | %I3 | 1B |
| $DEFINE | %I4 | 1C |
| $DEFINE | %I5 | 1D |
| $DEFINE | %K0 | 86 |
| $DEFINE | %K1 | 87 |
| $DEFINE | %K2 | 8E |
| $DEFINE | %K3 | 8F |
| $DEFINE | %K4 | 16 |
| $DEFINE | %K5 | 17 |
| $DEFINE | %K6 | 1E |
| $DEFINE | %K7 | 1F |
| $DEFINE | %L0 | 2F |
| $DEFINE | %M0 | B5 |
| $DEFINE | %M1 | 36 |
| $DEFINE | %M2 | A8 |
| $DEFINE | %M3 | B7 |
| $DEFINE | %P0 | A0 |
| $DEFINE | %P1 | A1 |
| $DEFINE | %P2 | A2 |
| $DEFINE | %P3 | A3 |
| $DEFINE | %P4 | A4 |
| $DEFINE | %P6 | A9 |
| $DEFINE | %P8 | 2B |
| $DEFINE | %P9 | 2C |
| $DEFINE | %Q0 | 10 |
| $DEFINE | %Q1 | 91 |
| $DEFINE | %Q2 | 92 |
| $DEFINE | %Q3 | 93 |
| $DEFINE | %Q4 | 94 |
| $DEFINE | %S0 | 30 |
| $DEFINE | %S1 | B1 |
| $DEFINE | %S2 | B2 |
| $DEFINE | %S3 | B3 |
| $DEFINE | %S4 | B4 |
| $DEFINE | %S5 | 38 |
| $DEFINE | %S6 | 39 |
| $DEFINE | %S7 | BA |
| $DEFINE | %S8 | BB |
| $DEFINE | %S9 | 3C |
| $DEFINE | %U0 | 95 |
| $DEFINE | %V0 | A5 |
| $DEFINE | %VW | AE |
| $DEFINE | %VP | BE |
| $DEFINE | %V1 | A6 |
| $DEFINE | %V2 | 27 |
| $DEFINE | %X0 | 02 |
| $DEFINE | %X1 | 03 |
| $DEFINE | %X2 | 04 |

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A method of organizing a state machine for controlling the operations of a virtual memory unit (VMU) in response to commands received from another unit, said VMU including a plurality of functional sections which generate status signals indicative of particular operations being performed by said plurality of functional sections in response to said commands during different cycles of operation of said unit, said method comprising:

(a) selectively connecting a substantially different consolidated group of said status signals relating to the operation of at least one of said plurality of functional sections as inputs to each of a plurality of programmable array logic (PAL) circuits;

(b) programming each of said plurality of PAL circuits for generating, in response to a corresponding consolidated group of said status signals, coded output signals at a number of outputs, said coded output signals corresponding to a first address resulting from logically combining different ones from said group of status signals generated during a current cycle of operation of said one of said plurality of functional sections to be used for determining a next operation to be performed by said one section during a next cycle of operation;

(c) connecting in common said number of outputs of said plurality of PAL circuits for providing a first address input to an addressable state memory having a plurality of locations and an output;

(d) storing, in said plurality of locations of said state memory, coded binary signals defining a plurality of required predefined states for sequencing said VMU in executing said commands within a minimum number of said different cycles;

(e) connecting the output of said state memory to a state register for storing the contents of one of said locations read out during a current cycle of operation of said VMU for defining the state of said VMU during said next cycle of operation at the earliest possible time for enabling processing of another command; and, (f) connecting the output of said state register as a second address input to said state memory and as an enabling input to each of said plurality of PAL circuits, said first and second address inputs causing the next state contents of a memory location to be read out into said state register from one of said plurality of locations whose address is defined by the first and second address inputs corresponding respectively to said state register contents and the output signals received from one of said plurality of PAL circuits which is enabled by said current state contents of said state register.

2. The method of claim 1 wherein said method further includes the step of (g) programming each of said PAL circuits so as to define a number of exception conditions occurring within said plurality of functional sections which enable sequencing of said state memory through a hierarchical sequence of states in a predetermined manner for said executing of said commands within a minimum number of cycles.

3. The method of claim 2 wherein said minimum number of cycles is one.

4. The method of claim 1 wherein said method further includes the steps of:

(g) connecting said state register and the output of said state memory as inputs to a subcommand generator which is connected to receive portions of said commands from said another unit, and, (h) said subcommand generator generating in response to said signals from said state memory, said state register and said another unit, a plurality of groups of control signals which are applied to said plurality of functional sections.

5. The method of claim 4 wherein said signals from said output of said state memory are used to precondition said plurality of functional sections in advance of execution of said next cycle of operation.

6. A state machine for controlling the operations of a processing unit including a number of functional sections which generate status signals indicative of the particular operations being performed by said number of functional sections during different cycles of operation in response to commands received by another unit, said state machine comprising:

a plurality of programmable array logic (PAL) circuits, each being selectively connected to receive a substantially different consolidated group of said status signals relating to the operation of at least one of said number of functional sections, each of said PAL circuits being programmed to generate, in response to a corresponding consolidated group of said status signals, coded output signals corresponding to a first address resulting from logically combining different ones of said group of status signals generated during a cycle of operation of said one of said number of functional sections to be used for determining a next operation to be performed by said one of said number of functional sections during said next cycle of operation;

an addressable state memory having a plurality of locations for storing coded binary signals defining a plurality of predefined states for sequencing said processing unit in executing predetermined ones of said commands within a minimum number of said different cycles of operation, said state memory having first and second address inputs; and, a clocked state register connected to said state memory for storing the contents of each of said locations read out during each cycle of operation of said processing unit for defining the state of said processing unit during said next cycle of operation within a minimum amount of time, said storing of said contents being used for enabling said processing unit to accept another command from said another unit, said state register being connected as a second address input to said state memory and to said PAL circuits, said first and second address inputs applying said state register contents and output signals received from one of said PAL circuits enabled by said current state contents of said state register respectively, for causing the readout of a memory location containing the next binary coded state signals used for generating subcommands for executing operations within said member of functional sections during said next cycle of operation.

7. The state memory of claim 6 wherein said processing unit is a virtual memory unit and said another unit is an address generator unit, said virtual memory unit being operative in response to said commands to translate input virtual addresses received from said address generator unit into physical addresses.

8. The state memory of claim 6 wherein each of said PAL circuits is programmed so as to detect exception conditions occurring within said member of functional sections which enable sequencing of said state machine through a hierarchical sequence of states in a predetermined manner for executing said commands within said minimum number of cycles.

9. The state memory of claim 8 wherein said minimum number of cycles is one for a first group of commands which have been classified into a first category which is performance sensitive and executable within said one cycle when all essential information is present and predetermined criteria have been met.

10. The state memory of claim 8 wherein said minimum number of cycles is two for a second group of commands which have been classified into a second category which is performance sensitive and executable within said two cycles when all essential information is present and predetermined criteria have been met.

11. The state memory of claim 8 wherein said minimum number of cycles is n where n is a whole number integer which has a value greater than a predetermined number of cycles for a third group of commands which have been classified into a third category which is not performance sensitive and is executable within said n cycles when all essential information is present and predetermined criteria have been met.

12. The state machine of claim 6 wherein said machine further comprises:

a subcommand generator connected to said state register and to the output of said state memory, said subcommand generator being connected to receive portions of said commands from said another unit, and, said subcommand generator generating in response to said signals from said state memory, said state register and said another unit, a plurality of groups of control signals for application to said number of functional sections.

13. The state machine of claim 12 wherein said processing unit includes conductor means for applying signals from said output of said state memory to said number of functional sections for preconditioning said number of functional sections in advance of execution of said next cycle of operation.

* * * * *